United States Patent
Shaffer et al.

(10) Patent No.: US 10,834,871 B2
(45) Date of Patent: Nov. 17, 2020

(54) WALK POWER MOWER WITH TRANSMISSION PROVIDING BOTH FORWARD AND REVERSE PROPULSION

(71) Applicant: THE TORO COMPANY, Bloomington, MN (US)

(72) Inventors: Chadwick A. Shaffer, Oakdale, MN (US); Todd A. Porter, Rosemount, MN (US); Steven J. Svoboda, Bloomington, MN (US)

(73) Assignee: THE TORO COMPANY, Bloomington, MN (US)

( * ) Notice: Subject to any disclaimer, the term of this patent is extended or adjusted under 35 U.S.C. 154(b) by 57 days.

(21) Appl. No.: 16/117,849

(22) Filed: Aug. 30, 2018

(65) Prior Publication Data
US 2018/0368316 A1  Dec. 27, 2018

Related U.S. Application Data

(63) Continuation of application No. 15/624,116, filed on Jun. 15, 2017, now Pat. No. 10,111,381, which is a
(Continued)

(51) Int. Cl.
*A01D 34/69* (2006.01)
*B62D 51/04* (2006.01)
(Continued)

(52) U.S. Cl.
CPC ......... *A01D 34/69* (2013.01); *A01D 34/6806* (2013.01); *A01D 34/824* (2013.01);
(Continued)

(58) Field of Classification Search
CPC .. A01D 34/69; A01D 34/6806; A01D 34/824; A01D 34/76; A01D 2034/6825;
(Continued)

(56) References Cited

U.S. PATENT DOCUMENTS 2,417,613 A   3/1947  Radabaugh
2,601,752 A   7/1952  Rose
(Continued)

FOREIGN PATENT DOCUMENTS

CN    101361428 A    11/2009
CN    201752183 U     3/2011
(Continued)

OTHER PUBLICATIONS

U.S. Appl. No. 15/195,648: Office Action dated Oct. 30, 2017; 11 pages.
(Continued)

*Primary Examiner* — Ruth Ilan
*Assistant Examiner* — Marlon A Arce
(74) *Attorney, Agent, or Firm* — Mueting Raasch Group

(57) ABSTRACT

A walk power mower having a cutting deck supported upon the ground by a front and rear wheel(s). The mower includes a traction drive system incorporating a bidirectional transmission adapted to propel the mower alternatively in both forward and reverse directions. In some embodiments, the mower may include a single bidirectional transmission (e.g., powering only rear wheel(s) or only front wheel(s) of the mower), while in other embodiments, two bidirectional transmissions may be provided to power both the front and the rear wheel(s). In other embodiments, the mower may include a bidirectional transmission powering the rear wheel(s), while the front wheel(s) may be attached to the deck via a caster assembly.

17 Claims, 16 Drawing Sheets

Related U.S. Application Data continuation-in-part of application No. 15/472,415, filed on Mar. 29, 2017, now Pat. No. 10,123,478.

(51) Int. Cl.

| | | |
|---|---|---|
| *B62B 5/00* | (2006.01) | |
| *A01D 34/82* | (2006.01) | |
| *A01D 34/68* | (2006.01) | |
| *A01D 34/76* | (2006.01) | |
| *A01D 101/00* | (2006.01) | |

(52) U.S. Cl.
CPC .......... *B62B 5/0026* (2013.01); *B62B 5/0073* (2013.01); *B62D 51/04* (2013.01); *A01D 34/76* (2013.01); *A01D 2034/6825* (2013.01); *A01D 2034/6837* (2013.01); *A01D 2034/6843* (2013.01); *A01D 2101/00* (2013.01)

(58) Field of Classification Search
CPC .... A01D 2034/6837; A01D 2034/6843; A01D 2101/00; B62B 5/0026; B62B 5/0073; B62D 51/04
See application file for complete search history.

(56) References Cited

U.S. PATENT DOCUMENTS

| | | | |
|---|---|---|---|
| 2,937,706 A | 5/1960 | Chandler | |
| 3,145,584 A | 8/1964 | Fairbank et al. | |
| 3,218,876 A | 11/1965 | Berger | |
| 3,225,853 A | 12/1965 | Norton et al. | |
| 3,388,759 A | 6/1968 | Plamper et al. | |
| 4,038,883 A | 8/1977 | Jones | |
| 4,209,964 A | 7/1980 | Fuelling, Jr. et al. | |
| 5,375,674 A | 12/1994 | Peter | |
| 5,718,105 A | 2/1998 | Irikura et al. | |
| 6,082,083 A | 7/2000 | Stalpes et al. | |
| 6,425,452 B1 | 7/2002 | Steiner et al. | |
| 6,668,529 B2 | 12/2003 | Busboom et al. | |
| 9,055,713 B2 | 6/2015 | Helgesen et al. | |
| 9,516,806 B2 | 12/2016 | Yamauchi et al. | |
| 9,677,648 B2 | 6/2017 | Wadzinski et al. | |
| 10,039,229 B2 | 8/2018 | Wadzinski et al. | |
| 10,111,381 B2 | 10/2018 | Shaffer et al. | |
| 10,123,478 B2 | 11/2018 | Shaffer et al. | |
| 2001/0047642 A1 | 12/2001 | Kent et al. | |
| 2002/0178708 A1 | 12/2002 | Williams et al. | |
| 2002/0189137 A1 | 12/2002 | Cox et al. | |
| 2003/0182919 A1 | 10/2003 | Baumann et al. | |
| 2006/0102410 A1 | 5/2006 | Dvorak | |
| 2007/0114076 A1 | 5/2007 | Osborne | |
| 2009/0266042 A1 | 10/2009 | Mooney et al. | |
| 2010/0025124 A1 | 2/2010 | Arpino | |
| 2013/0046448 A1 | 2/2013 | Fan et al. | |
| 2013/0291508 A1* | 11/2013 | Melone | B60G 9/00 |
| | | | 56/14.7 |
| 2015/0271991 A1 | 10/2015 | Balutis | |
| 2016/0302356 A1* | 10/2016 | Haun | A01D 75/28 |
| 2018/0343796 A1 | 12/2018 | Porter et al. | |
| 2020/0107497 A1 | 4/2020 | Ferrell et al. | |

FOREIGN PATENT DOCUMENTS

| | | |
|---|---|---|
| CN | 102232331 A | 9/2011 |
| EP | 2 170 032 B1 | 4/2012 |
| FR | 2 755 573 A1 | 5/1998 |
| JP | 62-18323 A | 1/1987 |
| JP | 04-166475 A | 6/1992 |
| JP | 2007-053991 A | 3/2007 |
| KR | 2009-0102037 A | 9/2009 |
| WO | WO 2013-122563 A1 | 8/2013 |
| WO | WO 2016/099616 A1 | 6/2016 |
| WO | WO 2017/158095 A1 | 9/2017 |

OTHER PUBLICATIONS

As Motor Germany, "Four wheel driven mower, Model AS 53 B6 RB-Kat" Operating Instructions. From Serial No. 020910020001. Issued Feb. 24, 2011, V7.0; 32 pages.

Husqvarna, Lawn Mower "HU725AWDHQ" Operator's Manual. Nov. 16, 2015; 40 pages.

MTD Products, "Self Propelled Mower" Operator's Manual. All Wheel Drive Model Series K and L. Form No. 769-11812A. Nov. 16, 2016; 28 pages.

* cited by examiner

WALK POWER MOWER WITH TRANSMISSION PROVIDING BOTH FORWARD AND REVERSE PROPULSION

This application is a continuation of U.S. patent application Ser. No. 15/624,116, filed Jun. 15, 2017, which is a continuation-in-part of U.S. patent application Ser. No. 15/472,415, filed Mar. 29, 2017, both of which are incorporated herein by reference in their respective entireties. Moreover, U.S. patent application Ser. No. 15/195,648, filed Jun. 28, 2016 and issued as U.S. Pat. No. 10,039,229 B2 on Aug. 7, 2018, is also incorporated herein by reference in its entirety.

TECHNICAL FIELD

Embodiments of the present disclosure relate to a walk power mower for cutting grass and, more particularly, to a transmission providing both forward and reverse propulsion.

BACKGROUND

Walk power mowers are well known for cutting grass. For example, such mowers are commonly used by property owners, such as homeowners, to cut their lawns. Such mowers have a cutting deck that houses a rotary grass cutting blade. The deck is supported by a plurality of wheels for rolling over the ground. A handle extends upwardly and rearwardly from the deck. A user who walks on the ground behind the deck grips a handle grip of the handle to manipulate and guide the mower during a grass mowing operation.

It can be difficult or is undesirable for some users to manually push a walk power mower over the ground in order to cut one's lawn. It is tiring to do so, particularly when the area being mowed is either large, hilly, or both. Thus, many mowers have traction drive systems that utilize part of the power generated by the prime mover carried on the mower to drive at least one pair of the mower's wheels, either the front wheels or the rear wheels, in a forward direction. Such a self-propelled mower relieves the user of the necessity of having to bodily push the mower over the ground. This greatly eases the physical effort required from the user in mowing one's lawn. The user now primarily guides or steers the mower during the powered forward motion provided by the traction drive system and the prime mover.

There are times when mowing one's lawn when the user needs to pull the mower in reverse at least over short distances. For example, when a user cuts grass under the branches of a bush, the user will ordinarily drive the mower forwardly so that the cutting blade reaches under the branches sufficiently to cut whatever patch of grass lies beneath the branches. However, once this patch of grass is cut, the user must pull back on the handle to pull the mower out from under the branches of the bush. While the traction drive system is designed with a one-way clutch to allow the drive wheels to free-wheel during reverse motion so that the user is not pulling back against the resistance provided by the gearing in the traction drive system, the drive wheels of the mower are typically unpowered during this reverse motion.

As a result, many users end up having to manhandle or wrestle the mower back in this reverse motion scenario. This requires the user to expend physical energy and for some users accomplishing manual reverse motion of the mower may be difficult or impossible in some situations. This difficulty is exacerbated for those users in which trimming operations requiring reverse motions of the mower are numerous or are required on difficult terrain. For example, in trimming beneath a bush, pulling back on the mower is even more difficult if the user has to pull the mower back up a slope to get it out from under the branches of the bush.

Another problem sometimes present during reverse mower movement is unintentional lifting of the mower's front wheels. That is, when a pulling force is applied at the offset mower handle, a moment is produced that causes the mower to rotate about a line of contact between the ground and the rear wheels. As one can appreciate, this rotation may cause the mower's front wheels to lift. While such lifting of the front wheels may be beneficial for various mower operations (e.g., turning), maintaining front wheel engagement with the ground during reverse may be advantageous (e.g., to maintain quality of cut).

SUMMARY

On aspect of this disclosure relates to a walk power equipment unit having a housing supported upon the ground by at least a front wheel and a rear wheel, the housing adapted to traverse the ground in both a forward direction and an opposite, reverse direction. The power equipment unit further includes a handle having a handle member extending upwardly and rearwardly from the housing, wherein the handle member includes: an upper end; and a lower end, the lower end attached to the housing. A prime mover is carried by the housing, as is a variable speed traction drive system. The traction drive system includes: a bidirectional transmission operatively connected to a drive wheel selected from the group comprising the front wheel and the rear wheel, the transmission operable to selectively rotate the drive wheel to propel the housing over the ground; and a control system comprising a handle grip translatable along the handle member. The handle grip activates the transmission to power the drive wheel for movement of the housing in the forward direction when the handle grip is translated downwardly along the handle member from a neutral position, and the handle grip activates the transmission to power the drive wheel for movement of the housing in the reverse direction when the handle grip is translated upwardly along the handle member from the neutral position.

In another aspect of the present disclosure, a walk power mower is provided that includes a deck supported upon the ground by front wheels and rear wheels, the deck adapted to traverse the ground in both a forward direction and an opposite, reverse direction, wherein the front wheels and/or the rear wheels operate as powered drive wheels of the mower. The mower also includes a handle comprising a handle member extending upwardly and rearwardly from the deck, wherein the handle member includes: an upper end; and a lower end, the lower end attached to the deck. A prime mover is carried by the deck and operatively connected to a cutting member associated with the deck. A variable speed, bidirectional transmission is also carried by the deck, wherein the transmission selectively rotates at least one of the drive wheels to effect propulsion of the deck over the ground. A control system is provided and includes a handle grip positioned at or near the upper end of, and translatable along, the handle member. Translation of the handle grip activates the transmission to power at least one of the drive wheels for movement of the deck: in the forward direction when the handle grip is translated downwardly along the handle member from a neutral position; and in the reverse direction when the handle grip is translated upwardly along the handle member from the neutral position.

In still yet another aspect of the present disclosure, a walk power mower is provided that includes a deck supported upon the ground by front wheels and rear wheels, the deck adapted to traverse the ground in both a forward direction and an opposite, reverse direction, wherein one or more of the front wheels and the rear wheels operate as a powered drive wheel of the mower. The mower also includes a handle having a handle member extending upwardly and rearwardly from the deck, wherein the handle member has: an upper end comprising a grip area; and a lower end attached to the deck. A prime mover is also provided and carried by the deck, the prime mover being operatively connected to a cutting member. A variable speed, bidirectional traction drive system is also carried by the deck, wherein the traction drive system selectively rotates the drive wheel to effect propulsion of the deck over the ground. A control system is carried on the handle and operatively connected to the traction drive system, wherein the control system comprises a first control member and a second control member that are each independently movable between a neutral position corresponding to a neutral mode of the traction drive system, and a fully engaged position corresponding to a powered mode of the traction drive system. The first control member, when moved from the neutral position to the engaged position, is adapted to manipulate the traction drive system from: the neutral mode; to a forward powered mode wherein the traction drive system rotates the drive wheel in a first direction corresponding to the forward direction of the deck. Similarly, the second control member, when moved from the neutral position to the engaged position, is adapted to manipulate the traction drive system from: the neutral mode; to a reverse powered mode wherein the traction drive system rotates the drive wheel in a second direction corresponding to the reverse direction of the deck.

In yet another aspect, the present disclosure relates to a walk power mower including: a grass cutting deck surrounding a grass cutting member, wherein the cutting deck is adapted to travel over the ground in both a forward direction and a reverse direction; and a handle comprising an upwardly and rearwardly extending handle member. The handle member includes an upper end comprising a grip area, and a lower end pivotally attached to the cutting deck such that the handle member pivots about a transverse pivot axis within an operating range of pivotal motion defined by: an upper stop corresponding to the handle being in a first operating orientation; and a lower stop corresponding to the handle being in a second operating orientation, the operating range of pivotal motion being at least about 5 degrees. A resilient member is operatively positioned between the lower stop and the handle member, wherein the resilient member is adapted to bias the handle member to a location at or near the upper stop.

In still another aspect, the present disclosure relates to a walk power mower comprising: a grass cutting deck supported upon the ground by a front wheel and a rear wheel, the cutting deck surrounding a grass cutting member, wherein the cutting deck is adapted to traverse the ground in both a forward direction and a reverse direction; at least one transmission adapted to selectively provide driving power to at least one wheel of the front and rear wheels; and a handle comprising first and second laterally spaced-apart and parallel handle members each extending upwardly and rearwardly from the cutting deck. The first and second handle members each comprise: an upper end; and a lower end pivotally attached to the cutting deck such that the handle members pivot about a transverse pivot axis within an operating range of pivotal motion defined by: an upper stop corresponding to the handle being in a first operating orientation; and a lower stop corresponding to the handle being in a second operating orientation, the operating range of pivotal motion being about 5-20 degrees. A control member is carried at or near the upper ends of the first and second handle members, wherein the control member, when moved to a first engaged position, is adapted to place the transmission into operation so that the transmission propels the mower in the forward direction. First and second resilient members are provided and positioned between the deck and the first and second handle members, respectively, the first and second resilient members adapted to bias the first and second handle members to a location at or near the upper stop.

In still yet another aspect, a walk power mower is provided that includes: a grass cutting deck supported upon the ground by a pair of front wheels and a pair of rear wheels, the cutting deck surrounding at least one grass cutting blade; and a variable speed traction drive system carried on the cutting deck and adapted to selectively provide driving power to at least one wheel of the front and rear pairs of wheels to propel the mower over the ground in both a forward direction and a reverse direction. A handle is also provided and includes first and second laterally spaced-apart and parallel handle members extending upwardly and rearwardly from the cutting deck, wherein the first and second handle members each comprise: an upper end; and a lower end pivotally attached to a rear portion of the cutting deck such that the handle members pivot about a transverse pivot axis within an operating range of pivotal motion defined by an upper stop and a lower stop. The mower also includes a control system carried at or near the upper ends of the first and second handle members, the control system operable to engage the traction drive system to selectively propel the cutting deck in both the forward direction and the reverse direction. First and second resilient members are provided and positioned between the deck and the first and second handle members, respectively. The first and second resilient members are adapted to resiliently deform when the handle members pivot, about the transverse pivot axis, from a position at or near the upper stop toward a position at or near the lower stop.

Yet another aspect of this disclosure relates to a walk power mower which comprises a deck supported by a pair of front wheels and a pair of rear wheels. The deck has at least one grass cutting blade that rotates in a substantially horizontal plane about a substantially vertical axis to cut grass. The deck also has an upwardly and rearwardly extending handle that is gripped by a user who walks on the ground behind the deck to guide and manipulate the deck during motion of the deck over the ground. A prime mover is carried by the deck, the prime mover being operably coupled to the blade for effecting powered rotation of the blade. A variable speed traction drive system is carried on the deck, the prime mover being operably coupled to the traction drive system for effecting powered rotation of the front wheels and the rear wheels. The traction drive system comprises a rear transmission having a rear axle that is operatively connected to the rear wheels for powering the rear wheels to provide self-propelled motion of the deck in a first direction of motion over the ground, a front transmission having a front axle that is operatively connected to the front wheels for powering the front wheels to provide self-propelled motion of the deck in a second direction of motion over the ground that is opposite to the first direction of motion, and a control system carried on the handle that is selectively operable by a user for placing only one transmission at a time into operation so that the rear transmission is active to propel the deck in the first direction while the front transmission is inactive or the front transmission is active to propel the deck in the second direction while the rear transmission is inactive.

Yet another aspect of this disclosure relates to a walk power mower which comprises a traction drive system on a grass cutting deck having a pair of front wheels and a pair of rear wheels. A pair of transmissions power at least one pair of wheels on the deck. A first one of the transmissions provides forward motion of the mower when it is active and a second one of the transmissions provides rearward motion of the mower when it is active. A slidable handle grip is provided on a handle extending upwardly and rearwardly from the cutting deck. The handle grip has a cross bar long enough to be gripped by both hands of the user. The handle grip activates the first one of the transmissions when it is slid downwardly on a handle out of a neutral position thereof as a user walks forwardly holding the cross bar of the handle grip. The handle grip activates the second one of the transmissions when it is slid upwardly on the handle out of the neutral position as a user walks rearwardly holding the cross bar of the handle grip.

BRIEF DESCRIPTION OF THE DRAWINGS

Embodiments of this disclosure will be described more fully in the following Detailed Description, when taken in conjunction with the following drawings, in which like reference numerals refer to like elements throughout.

FIGS. 7A-7C illustrate various embodiments of a traction drive system in accordance with embodiments of the present disclosure, wherein: FIG. 7A is a diagrammatic view of a bidirectional transmission powered by a belt connected to a prime mover of the mower; FIG. 7B is a diagrammatic view of a bidirectional transmission powered by an independent motor separate from the mower's prime mover; and FIG. 7C is a diagrammatic view of a bidirectional transmission(s) attached to a drive wheel of the mower, wherein each transmission is configured as an electric motor;

FIGS. 10A-10B illustrate a mower in accordance with another embodiment of this disclosure, the mower incorporating a biased or "floating" handle, wherein: FIG. 10A is a rear perspective view; and FIG. 10B is a front perspective view;

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION

Figure 1:
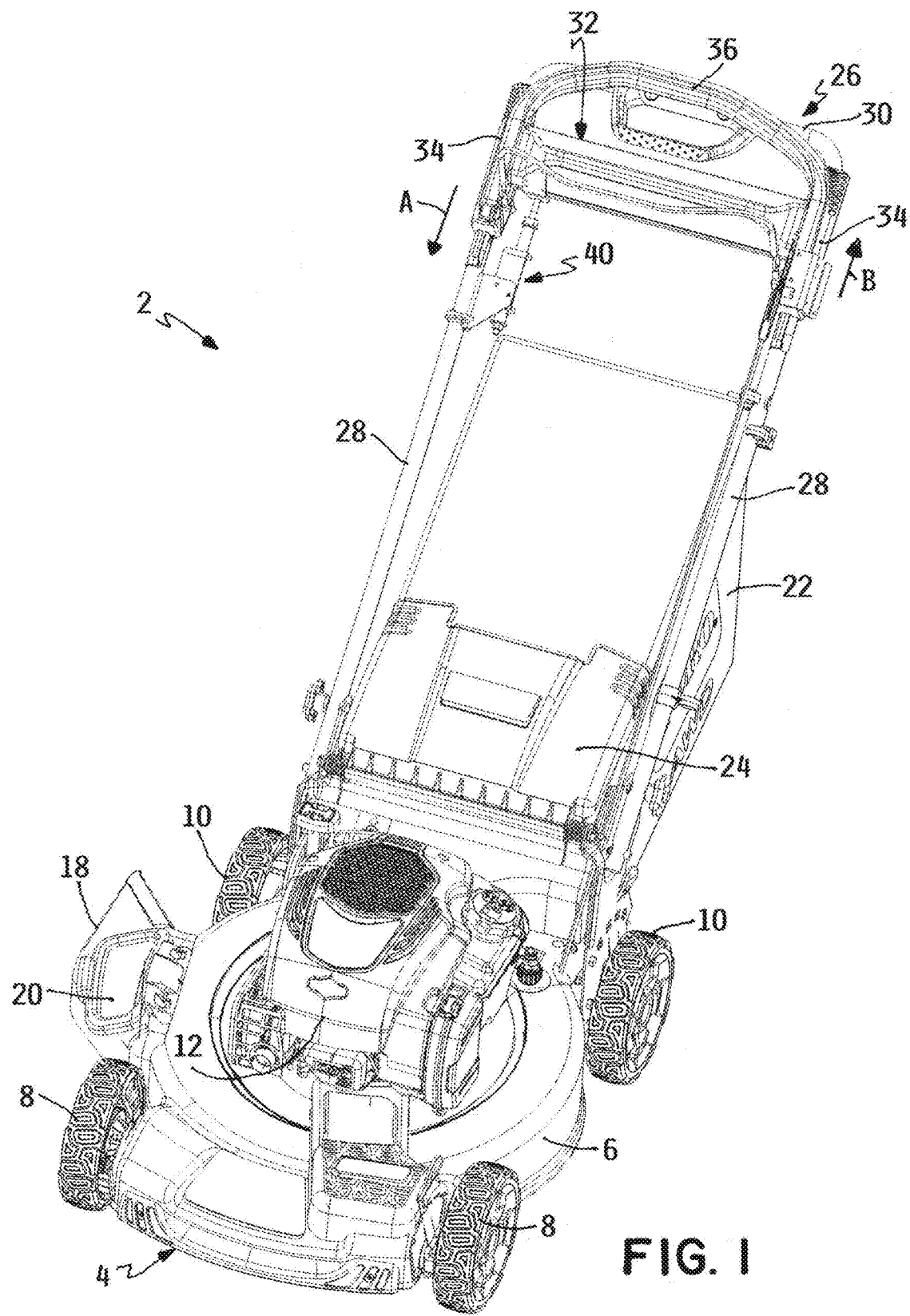
FIG. 1 is a perspective view of one embodiment of a walk power mower according to this disclosure.
Figure 3:
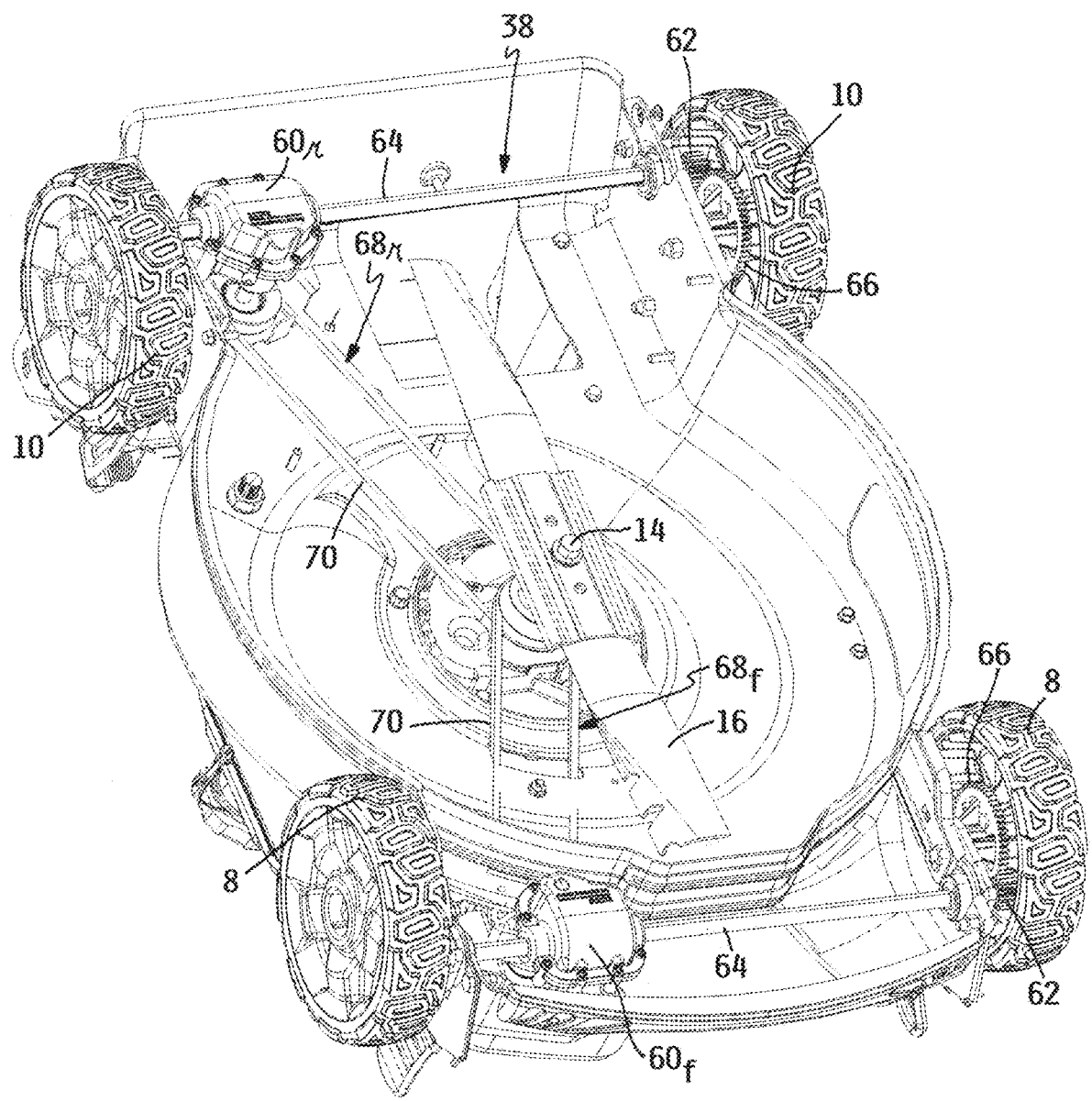
FIG. 3 is a perspective view of the underside of the cutting deck of the mower of FIG. 1, particularly illustrating a dual transmission traction drive system.

One embodiment of a walk power mower 2 according to this disclosure is illustrated in FIG. 1. Mower 2 comprises a housing or cutting deck 4 that is formed with a generally toroidal cutting chamber 6 that faces downwardly and is open at its bottom. Deck 4 is supported for rolling over the ground by a pair of front wheels 8 and a pair of rear wheels 10. A prime mover 12, such as an internal combustion engine, is carried on top of deck 4. Referring now to FIG. 3, the drive shaft 14 of the prime mover extends vertically downwardly with its lower end extending into cutting chamber 6. A horizontal cutting member or blade 16 is positioned within cutting chamber 6 and is removably secured to the lower end of drive shaft 14 to rotate in a generally horizontal cutting plane to cut grass.

Referring again to FIG. 1, mower 2 is a three-in-one mower having side discharge, rear bagging and mulching modes of operation. In the side discharge mode, a side discharge chute 18 can be mated with a side discharge opening to discharge grass clippings to the side of mower 2 when a side discharge door 20 is opened. In the rear bagging mode, a grass clipping collection bag 22 is mated with a rear discharge opening to collect grass clippings being discharged to the rear of mower 2 when a rear discharge door 24 is opened. While FIG. 1 illustrates deck 4 as being both in the side discharge mode and the rear bagging mode, this is only for the purpose of illustration as these two modes would not be used simultaneously. When side discharge chute 18 is removed and side discharge door 20 is closed and when bag 22 is removed and rear discharge door 24 is closed, mower 2 is placed into its mulching mode in which grass clippings are driven downwardly out of cutting chamber 6 to discharge the clippings beneath mower 2. However, mower 2 need not have multiple modes of operation, but could be built as a single purpose side discharge, rear bagger, or mulching mower.

An upwardly and rearwardly extending handle 26 comprising a pair of laterally spaced handle members or tubes 28 joined by a top cross member 30. The lower ends of handle tubes 28 are attached to the rear of deck 4. Handle 26 includes a U-shaped handle grip 32 that has a pair of laterally spaced legs 34 connected together by an upper cross bar 36. Legs 34 of handle grip 32 are telescopically received on handle tubes 28 of handle 26 for sliding movement relative thereto. Thus, handle grip 32 is able to slide downwardly (translate along) on handle tubes 28 as a user walks forwardly while gripping cross bar 36 of handle grip 32 with both of the user's hands.

Handle grip 32 slides downwardly by an amount that depends upon how fast the user walks forwardly. As will be described in more detail hereafter, the extent or amount of downward travel of handle grip 32 controls a traction drive system 38 (see FIG. 3) of mower 2 to vary the forward ground speed of mower 2 to correspond to the user's walking pace. This type of speed controlling, slidable handle grip is used on the Personal Pace® line of walk power mowers manufactured and sold by The Toro Company, the assignee herein. In addition, this type of slidable handle grip is disclosed more fully in U.S. Pat. No. 6,082,083 to Stalpes et al., which patent is hereby incorporated by reference and shall be referred to as "Stalpes" hereafter.

In Stalpes, handle grip 32 is in a neutral, i.e., a drive disengaged position, when handle grip 32 is at the top of handle 26 with handle grip 32 located adjacent to cross member 30 that joins handle tubes 28 together. The only control motion of handle grip 32 in Stalpes is the downward sliding motion that engages the traction drive system of Stalpes in forward and that varies the forward ground speed in concert with the user's forward walking pace. When the user lets go of handle grip 32 in Stalpes, handle grip 32 is spring biased to slide back up handle 26 to return to the top thereof at which point the traction drive system becomes disengaged once again.

In mower 2 of this disclosure, the Stalpes handle grip 32 has been modified so that the neutral position of handle grip 32 is no longer at the top of the range of motion of handle grip 32. Now, the neutral position of handle grip 32 is displaced somewhat downwardly from cross member 30 of handle 26. A return to neutral system 40 maintains handle grip 32 in its now lower neutral position relative to cross member 30 of handle 26.

Handle grip 32 functions as it did in Stalpes when the user grips cross bar 36 of handle grip 32 and walks forwardly, i.e., handle grip 32 slides downwardly in the direction of the arrow A in FIG. 1 to activate traction drive system 38 in forward and to vary the forward ground speed in concert with the user's forward walking pace. Now, however, if the user grips cross bar 36 of handle grip 32 and walks rearwardly, as when pulling mower 2 back, handle grip 32 is now also able to slide upwardly out of neutral rather than being held in neutral as in Stalpes. This upward sliding motion of handle grip 32 is shown by the arrow B in FIG. 1. This activates traction drive system 38 in reverse and varies the reverse ground speed of mower 2 in concert with the user's rearward walking pace. In either forward or reverse powered motion of mower 2, when the user lets go of handle grip 32, return to neutral system 40 causes handle grip 32 to slide back to its centered neutral position between the lower and upper limits of the range of motion of handle grip 32 to disengage traction drive system 38.

Figure 2:
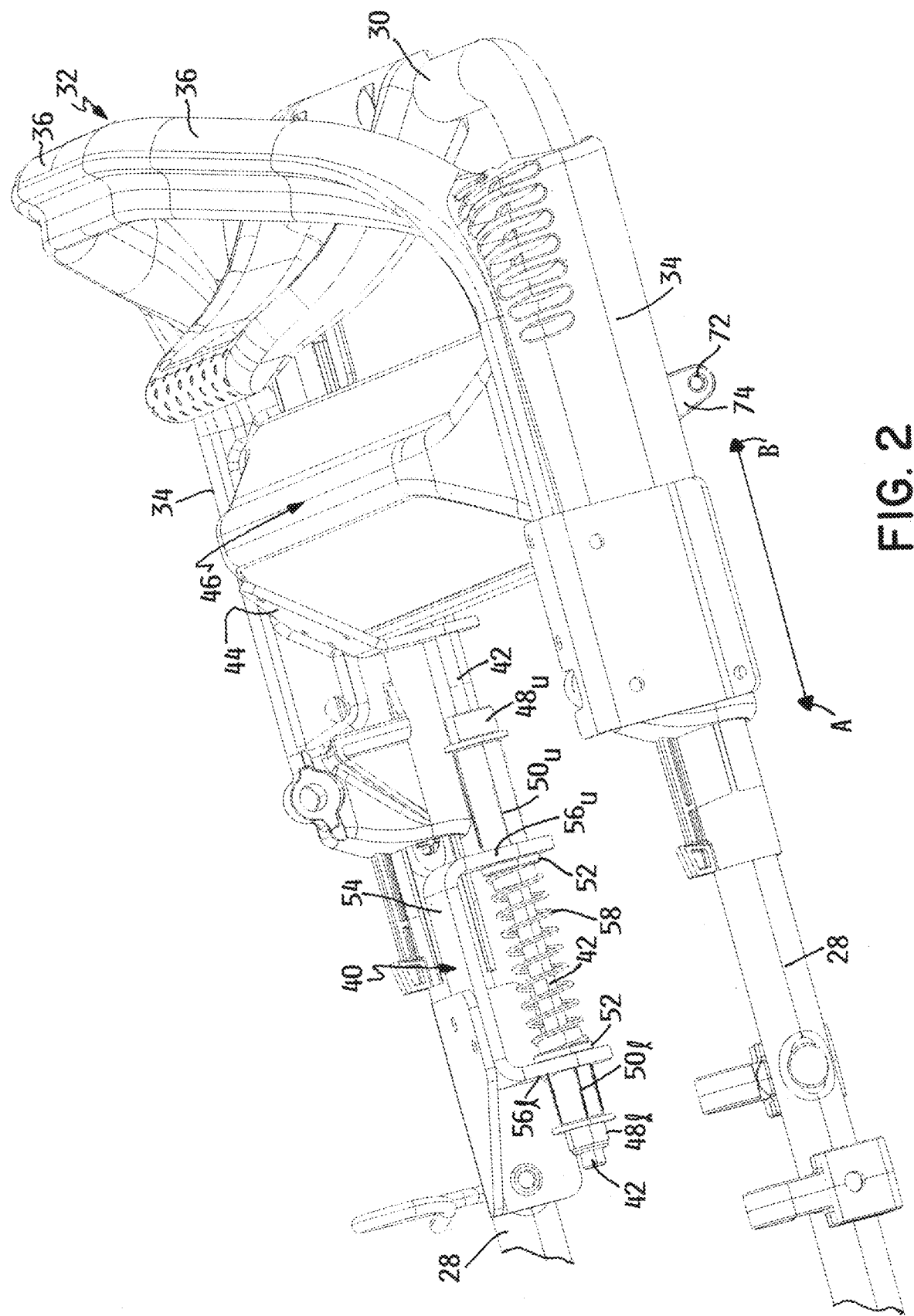
FIG. 2 is an enlarged perspective view of a portion of the handle of the mower of FIG. 1, particularly illustrating the return to neutral system that causes the slidable handle grip of the handle to return to a neutral position in which the traction drive system is disengaged once the user releases the handle grip.

Referring now to FIG. 2, return to neutral system 40 comprises a rod 42 having an upper end fixed by a bracket 44 to a laterally extending cross member 46 that is also part of handle grip 32. Rod 42 has spaced upper and lower push nuts $48_u$ and $48_l$ fixed thereto to move with rod 42. Push nuts 48 bear respectively against one end of cylindrical, upper and lower, push tubes $50_u$ and $50_l$ which are spaced along the length of rod 42 and through which rod 42 slides. Each push tube 50 has an annular thrust surface 52 that is formed as an integral part thereof. Push tubes 50 are assembled in an inverted relationship relative to each other along the length of rod 42 such that thrust surface 52 of upper push tube $50_u$ is at the lowermost end of upper push tube $50_u$ while thrust surface 52 of lower push tube $50_l$ is at the uppermost end of lower push tube $50_l$.

Return to neutral system 40 further includes a U-shaped clevis 54 fixed to handle 26 with the spaced, parallel side walls 56 of clevis 54 forming an upper wall $56_u$ and a lower wall $56_l$. Upper and lower push tubes $50_u$ and $50_l$ when assembled on rod 42 are arranged to pass through bores in upper and lower walls $56_u$ and $56_l$ of clevis 54 with thrust surfaces 52 on upper and lower push tubes $50_u$ and $50_l$ being inside clevis 54 immediately adjacent to upper and lower walls $56_u$ and $56_l$ of clevis 54. A compression spring 58 is arranged inside clevis 54 with the ends of spring 58 bearing against thrust surfaces 52 of upper and lower push tubes $50_u$ and $50_l$. When return to neutral system 40 is properly adjusted and traction drive system 38 is in neutral, spring 58 will force upper and lower push tubes $50_u$ and $50_l$ apart until thrust surfaces 52 thereon abut against the upper and lower walls $56_u$ and $56_l$ of clevis 54 and the opposite ends of upper and lower push tubes $50_u$ and $50_l$ are immediately adjacent to upper and lower push nuts $48_u$ and $48_l$.

When the user pushes down on handle grip 32 to initiate powered forward motion of mower 2, upper push nut $48_u$ on rod 42 presses down on the upper end of upper push tube $50_u$ to slide upper push tube $50_u$ downwardly relative to clevis 54. Note that lower push tube $50_l$ remains stationary with rod 42 simply sliding through lower push tube $50_l$ since the lower push nut $48_l$ moves away from the lowermost end of lower push tube $50_l$ and lower push tube $50_l$ remains within clevis 54 since thrust surface 52 on lower push tube $50_l$ is held in place by its engagement with lower wall $56_l$ of clevis 54. The downward motion of upper push tube $50_u$ compresses spring 58 downwardly. Thus, when the user eventually releases handle grip 32, the compressed spring 58 pushes back upwardly on upper push tube $50_u$ to cause the uppermost end of upper push tube $50_u$ to push the upper push nut $48_u$ back upwardly, thereby returning handle grip 32 to its centered neutral position.

Return to neutral system 40 works the same way but in an opposite fashion when handle grip 32 is pulled upwardly in the direction of the arrow B to initiate reverse powered motion of mower 2. This time it is lower push tube $50_l$ that is pushed upwardly by lower push nut $48_l$ with upper push tube $50_u$ remaining stationary. Thus, spring 58 is compressed upwardly. When handle grip 32 is eventually released, the lowermost end of lower push tube $50_l$ pushes downwardly on lower push nut $48_l$ as the upward compression of spring 58 is released to slide handle grip 32 back downwardly to return handle grip 32 to its centered neutral position.

Referring now to FIG. 3, traction drive system 38 comprises a first rear transmission $60_r$ which powers rear wheels 10 of mower 2 and a second front transmission $60_f$ which powers front wheels 8 of mower 2. Transmissions 60 preferably comprise, but are not limited to, mechanical gear drive transmissions that use various speed reduction stages to reduce the relatively high rotational speed of drive shaft 14 of prime mover 12 to a lower speed suitable for self-propelling mower 2 at ground speeds that match the walking pace of the user. Some of these speed reduction stages are built into the gearing inside the housings of transmissions 60. However, the final speed reduction stage is formed by a small diameter drive gear 62 on each end of an axle 64 of each transmission 60 that drives a larger diameter driven gear 66 fixedly attached to one of wheels 8, 10.

Drive gears 62 on the opposite ends of axle 64 of rear transmission $60_r$ engage the backsides of driven gears 66 of rear wheels 10. The reverse is true for drive gears 62 for front transmission $60_f$ which engage the front sides of driven gears 66 of front wheels 8. Thus, when axles 64 of transmissions 60 are rotated in opposite directions by the operation of prime mover 12, front and rear drive wheels 8 and 10 will be rotated in opposite directions relative to each other. For example, if rear drive wheels 10 are rotated in a forward direction to propel mower 2 forwardly, front drive wheels 8 will be rotated in a rearward direction to propel mower 2 in reverse. As a consequence, it should be apparent that only one transmission 60 is active at any given time while the other transmission 60 remains inactive. Either transmission 60 can be selected to be the one that provides forward motion while the remaining transmission 60 will then be the one that provides reverse motion.

Rear transmission 60 preferably has a split axle 64 and provides a differential action to permit rear wheels 10 to be driven at different speeds during a turn, such as when the user swings mower 2 around 180° at the end of a pass when mowing his or her lawn, to avoid tearing or scuffing the grass. Rear wheels 10 may rotate at different speeds during turns using either an unpowered or powered differential. For example, in an unpowered differential which is preferred due to somewhat lower cost, the portion of split axle 64 powering whichever rear wheel 10 is on the outside of the turn simply overruns the rotational speed of the portion of split axle 64 powering the rear wheel 10 on the inside of the turn to create the difference in wheel speed. Since front wheels 8 of mower 2 are typically lifted up off the ground during such a turnaround of mower 2, front transmission 60 preferably has a solid axle and lacks any differential action, thereby reducing overall cost of mower 2.

Each transmission 60 is provided with a one-way clutch that permits the wheels driven by that transmission 60 to free wheel when mower 2 is being propelled in a direction opposite to the direction transmission 60 is designed to operate. In the example where one transmission is active and is driving mower 2 forwardly while the other reverse drive transmission is inactive and is not in operation, the one-way clutch in the inactive reverse drive transmission permits the drive wheels coupled to that transmission to rotate freely with respect to the internal gearing of the reverse drive transmission to avoid the drag or resistance such internal gearing would otherwise provide when mower 2 moves forwardly.

Each front and rear transmission $60_f$ and $60_r$ is separately driven by its own independent belt drive $68_f$ and $68_r$ from drive shaft 14 of prime mover 12. Each transmission 60 is a rocking transmission of the type disclosed in Stalpes. When handle grip 32 is in neutral and both transmissions 60 are inactive, belts 70 in belt drives 68 are sufficiently slack so that the input pulleys on transmissions 60 are stationary even though drive shaft 14 of prime mover 12 is rotating. Effectively, mower 2 is at rest even with the engine running when handle grip 32 is not being pushed or pulled by the user.

However, as the user slides handle grip 32 up or down on handle 26 in either the downward direction A or the upward direction B, this motion rocks one transmission 60 in a direction (rearwardly about its axle 64 for rear transmission $60_r$ and forwardly about its axle 64 for front transmission $60_f$) to tighten drive belt 70 to the rocking transmission while leaving drive belt 70 to other transmission slack. As drive belt 70 to the rocking transmission becomes taut, the transmission becomes active to begin rotating the pair of wheels powered by the rocking transmission. The speed of rotation of axle 64 of the rocking transmission, and thus the ground speed of mower 2, progressively increases as handle grip 32 is moved ever further in the selected direction and the tautness of belt 70 progressively increases. Thus, the ground speed of mower 2 progressively increases from zero to a maximum speed as handle grip 32 travels out of neutral to the end of its range of motion in the selected direction A or B. This enables the ground speed of mower 2 to be matched to the walking pace of the user whether mower 2 is being propelled in forward or reverse.

First and second Bowden cables (not shown) having inner wires carried within outer conduits operably couple handle grip 32 to transmissions 60. The first Bowden cable has a "live cable" setup in which a rear end of the outer conduit is fixed or clamped to handle 26 and the front end of the outer conduit is fixed or clamped to a lower end of one handle tube 28 or to a rear end of deck 4. The rear end of the inner wire of the first Bowden cable is secured to an opening 72 in a pivotal tab 74 (see FIG. 2) that is rotated rearwardly when handle grip 32 is moved downwardly in the direction of arrow A. The front end of the inner wire of the first Bowden cable is then attached to rear transmission $60_r$ to rock rear transmission $60_r$ rearwardly during downward motion of handle grip 32 in the direction of arrow A. In this "live cable" setup of the first Bowden cable, the downward motion of handle grip 32 causes the "live" inner wire of the first Bowden cable to slide rearwardly within the outer conduit in order to rock rear transmission $60_r$ rearwardly while the outer conduit remains fixed in place. The "live cable" setup of the first Bowden cable and its interaction with pivotal tab 74 is shown and described in more detail in the Stalpes patent which has previously been incorporated by reference herein.

The second Bowden cable has a "live conduit" setup in which the front end of the inner wire is fixed or clamped in place to deck 4 and the rear end of the inner wire is fixed or clamped in place to handle grip 32. The rear end of the conduit in the second Bowden cable is fixed or clamped in place to an upper portion of one handle tube 28 adjacent the place where the rear end of the inner wire of the second Bowden cable attaches to handle grip 32. The front end of the conduit in the second Bowden cable is clamped or fixed to front transmission 60 to rock front transmission 60 forwardly during upward motion of handle grip 32 in the direction of arrow B. In this "live conduit" setup, the upward motion of handle grip 32 in the direction of arrow B deforms the shape of the clamped inner wire of the second Bowden cable. This deformation in the shape of the inner wire causes the "live" conduit of the second Bowden cable to slide forwardly over the inner wire to push against front transmission $60_f$ to rock front transmission $60_f$ forwardly. Only one Bowden cable applies force to only one transmission at any given time with the other Bowden cable not applying force to the other transmission so that only one transmission at a time is activated.

Mower 2 equipped with traction drive system 38 of this disclosure has powered operation of rear transmission $60_r$ to propel mower 2 forwardly in a variable speed manner as handle grip 32 is gripped by the user and the user walks forwardly, thereby sliding handle grip 32 downwardly on handle 26 in an amount proportional to the walking pace of the user. However, when trying to pull mower 2 back during a trimming operation or when trying to mow a small patch of grass in reverse, the user no longer has to use manual force to manhandle mower 2 in the reverse direction. Instead, the user merely maintains his or her grip on cross bar 36 of handle grip 32 and walks rearwardly at any desired pace. This will slide handle grip 32 upwardly on handle 26 to initiate powered operation of front transmission 60 to propel mower 2 rearwardly at a variable ground speed commensurate to the walking pace of the user. Thus, the task of operating mower 2 is greatly eased since mower 2 is self-propelled both in forward and reverse while maintaining the functionality of the Personal Pace® control system of The Toro Company that had previously been used only on mowers that were self-propelled in forward only.

The advantages of a mower that is self-propelled in both forward and reverse is achieved in a cost-effective manner by using mechanical, gear drive transmissions that are both durable and inexpensive in comparison to using hydraulic motor/pump combinations or electric motor/drive combinations. Moreover, since transmissions 60 used to drive front and rear wheels 8, 10 are different from one another and are mounted on separate front and rear axles, this allows rear transmission $60_r$ to have a split axle/differential action configuration while front transmission $60_f$ has a solid axle/non-differential action configuration. The manner of driving front and rear wheels 8, 10 using the same size drive gears 62 on the ends of the axles of the front and rear transmissions and the same size driven gears 66 on the wheels, but simply reversing which sides of driven gears 66 are engaged by drive gears 62, leads to increased part commonality and thus reduced cost. This allows a powered, reversible mower to be manufactured and sold at a reasonable cost.

Figure 4:
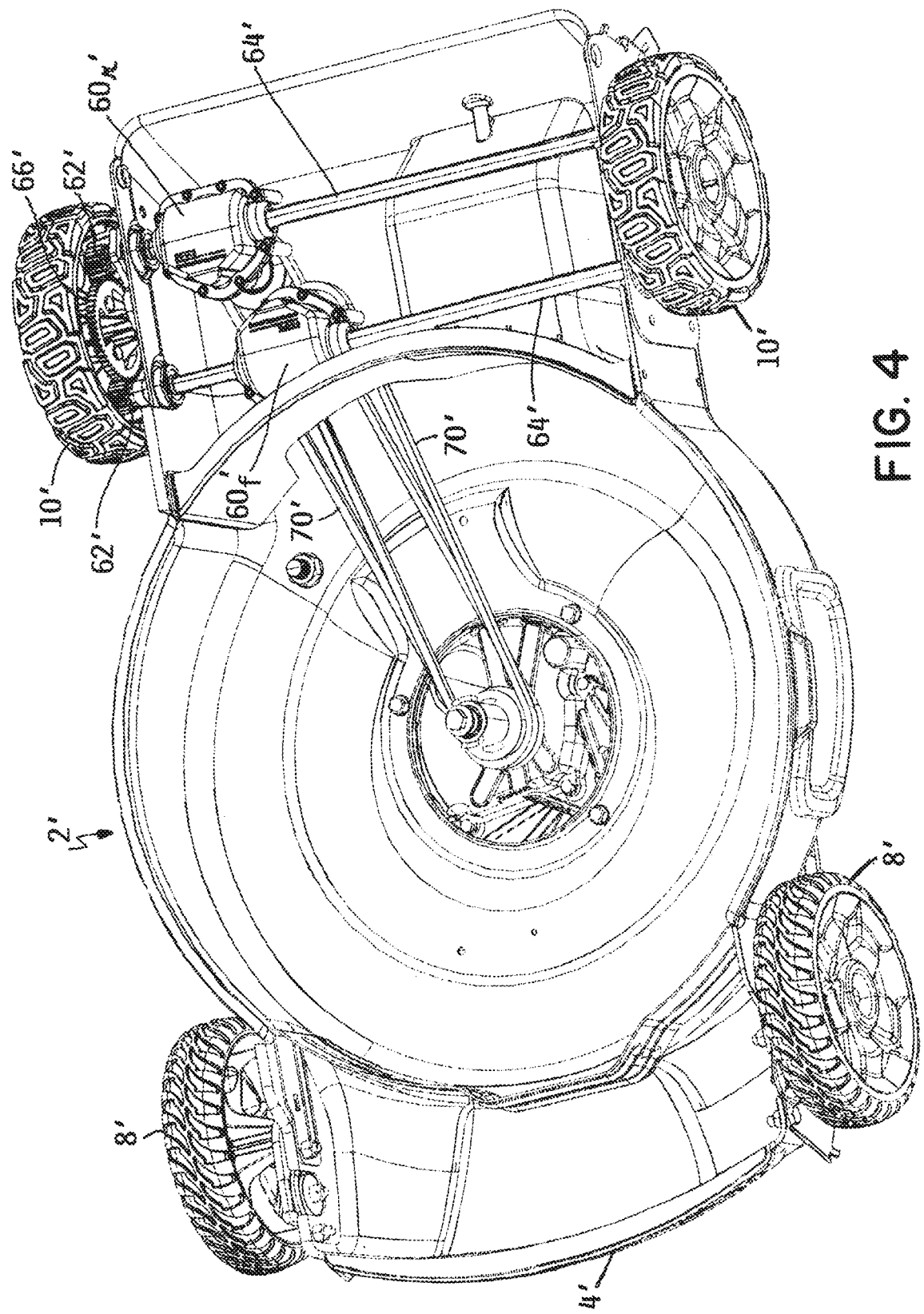
FIG. 4 is a perspective view of a portion of a second embodiment of a walk power mower according to this disclosure.
Figure 5:
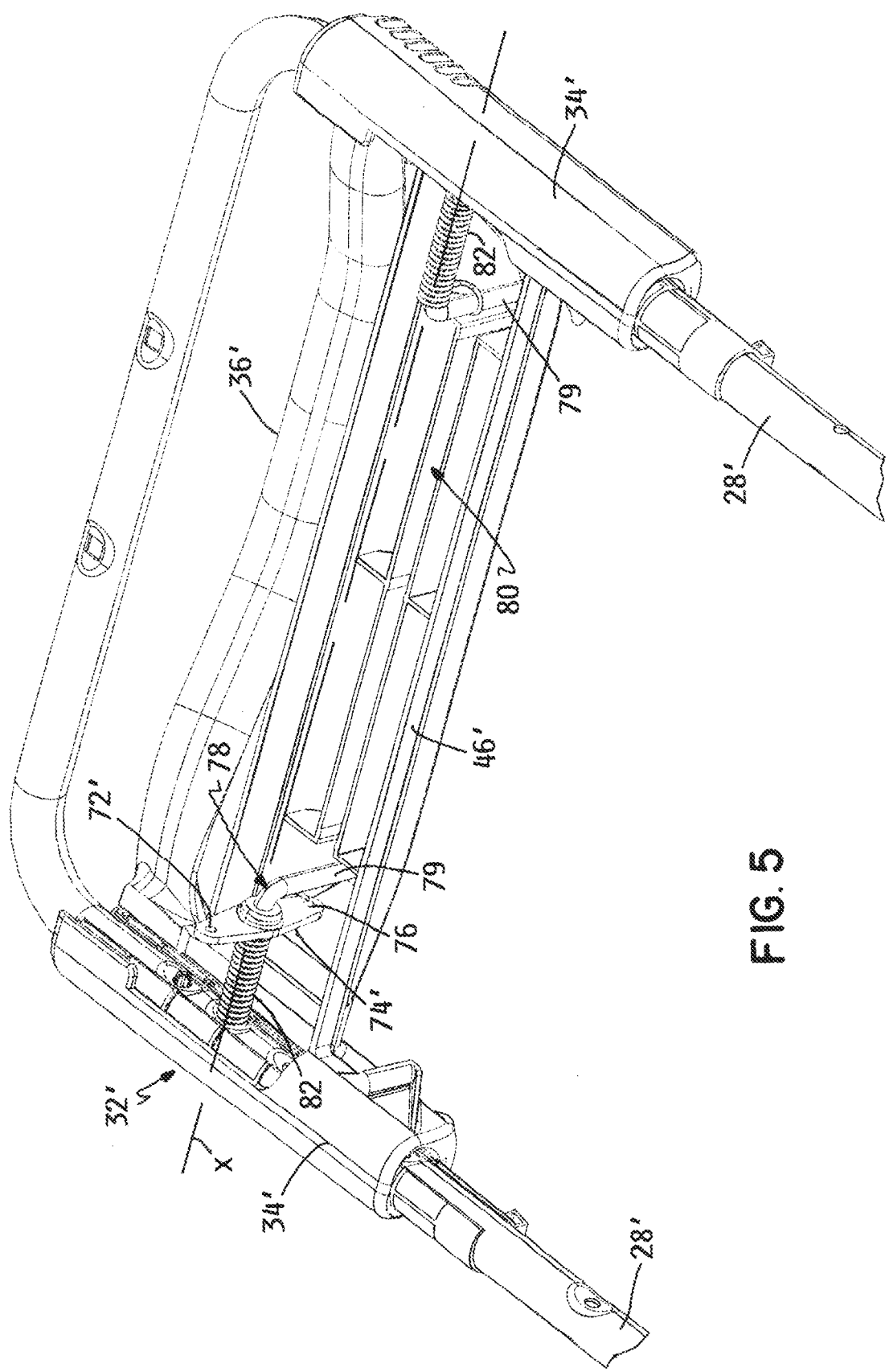
FIG. 5 is an enlarged perspective view of a portion of the handle of the mower of FIG. 4, particularly illustrating a second embodiment of the return to neutral system that causes the slidable handle grip of the handle to return to a neutral position in which the traction drive system is disengaged once the user releases the handle grip.

Referring now to FIGS. 4 and 5, a second embodiment of a mower according to this disclosure is illustrated generally as 2'. The same reference numerals used in FIGS. 1-3 to refer to components will be used in FIGS. 4 and 5 to refer to the same or corresponding components with a prime designation being used to refer to those components in the second embodiment, e.g. mower 2' in FIGS. 4 and 5 as opposed to mower 2 in FIGS. 1-3.

Referring now to FIG. 4, in mower 2' front transmission $60_f'$ and its axle 64' have been relocated from the front to the back of mower 2' so that only rear wheels 10' are reversibly driven by the dual transmissions $60_f'$ and $60_r'$ with such transmissions and their axles being disposed on opposite sides of the axis of rotation of rear wheels 10'. In this embodiment, front wheels 8' are present but unpowered with only rear wheels 10' serving to self-propel mower 2'. As in the first embodiment concerning mower 2, only one transmission 60' (driven by belt 70' and having a drive gear 62' engaged with driven gear 66') is active at any given time while the other transmission 60' (driven by another belt 70' and also having a drive gear 62' engaged with driven gear 66') remains inactive. Propelling rear wheels 10' in opposite directions may yield better traction than using front wheels 8' to drive mower 2' in the direction that is opposite to the direction that rear wheels 10' drive mower 2'. This is due to the fact that more of the weight of a mower like mower 2, 2' is over rear wheels 10' as compared to front wheels 8'. In addition, the filling of a grass clipping collection bag at the rear of mower 2' with grass clippings during a mowing operation only accentuates this rearward weight distribution.

In mower 2' as shown in FIG. 4, whichever transmission 60' is used to produce forward motion of mower 2' is preferably one having a split axle/differential feature as described earlier with respect to rear transmission $60_r$ in mower 2. The other transmission 60' that is used to produce reverse motion of mower 2' could also be one having a split axle/differential feature since both transmissions are now being used to power rear wheels 10'. However, since the times at which reverse motion is needed and the distances over which mower 2' would travel in reverse are much more limited than what is required for forward motion, whichever transmission 60' propels the mower in reverse could remain a transmission having a solid axle without any differential ability.

In addition to the use of both transmissions 60' to drive rear wheels 10', a simplified Bowden cable coupling setup is used in mower 2' as shown in FIG. 5. In mower 2', pivotal tab 74' now has a second opening 76 that is disposed on an opposite side of a horizontal axis of rotation, illustrated as x in FIG. 5, of a pivot rod 78 compared to the location of first opening 72' in tab 74'. As taught in more detail in Stalpes, tab 74' is rigidly attached to rod 78 to pivot by virtue of the pivoting motion of rod 78 caused by journaling the ends of rod 78 in the mower handle tubes 28' while a middle U-shaped portion 79 of rod 78 is captured within a channel 80 in cross member 46' of slidable handle grip 32'. Again, rod 78 and its interaction with cross member 46' are detailed more fully in the Stalpes patent which has been incorporated by reference herein.

When the user slides handle grip 32' downwardly on handle tubes 28', the portion of tab 74' having opening 72' is pivoted rearwardly as described in connection with the operation of mower 2. This pulls rearwardly on the "live cable" setup of the first Bowden cable that is connected to whichever transmission 60' is arranged to drive mower 2' forwardly to actuate the forward drive transmission 60'. Whichever transmission 60' is arranged to drive mower 2' in reverse is now connected by a "live cable" setup of the second Bowden cable to the newly added second opening 76 in tab 74'. Thus, when the user pulls handle grip 32' upwardly on handle tubes 28' as he or she walks in reverse, the portion of tab 74' having opening 76 is now pivoted rearwardly to actuate the reverse drive transmission 60'. Since both transmissions 60' are now at the rear of mower 2', the length of the second Bowden cable run is shortened compared to the length required in mower 2, and a "live cable" rather than a "live conduit" setup of the Bowden cable is used. This simplifies the routing and arrangement of the Bowden cables. However, the operation of mower 2' is the same as mower 2, namely pushing handle grip 32' downwardly as the user walks forwardly powers mower 2' in a forward direction at a speed commensurate to the user's walking pace while pulling handle grip 32' upwardly as the user walks rearwardly powers mower 2' in a rearward direction at a speed commensurate to the user's walking pace.

Referring still further to FIG. 5, the use of the double headed tab 74' as described above to activate both transmission $60_f'$ and $60_r'$ in mower 2' permits a simplified return to neutral system 40'. All that is required now is the use of one or more torsion springs 82, preferably two such springs 82, surrounding the ends of rod 78 that lie along and define the rotational axis x of rod 78 with such springs being anchored at one end on rod 78 and at the other end on a portion of the adjacent handle tube 28'. When handle grip 32' is located in its centered, neutral, drive disengaging position, torsion springs 82 are in their unstressed state such that handle grip 32' is retained in neutral. As rod 78 is rotated about axis x in either one direction or the other due to motion of handle grip 32' relative to handle tubes 28', torsion springs 82 get coiled up or twisted in one direction or the other to resist the motion of handle grip 32' out of neutral. When the user subsequently releases handle grip 32', the biasing force built up in the coiled torsion springs 82 is now free to act on handle grip 32' to move it back to neutral.

The return to neutral system 40' as shown in FIG. 5 is simpler and thus less costly than system 40 shown in FIGS. 1-3 and takes up less space on mower 2'. Thus, the cable coupling setup and return to neutral system 40' shown in FIG. 5 could be used with mower 2 shown in FIGS. 1-3 if so desired.

Figure 6:
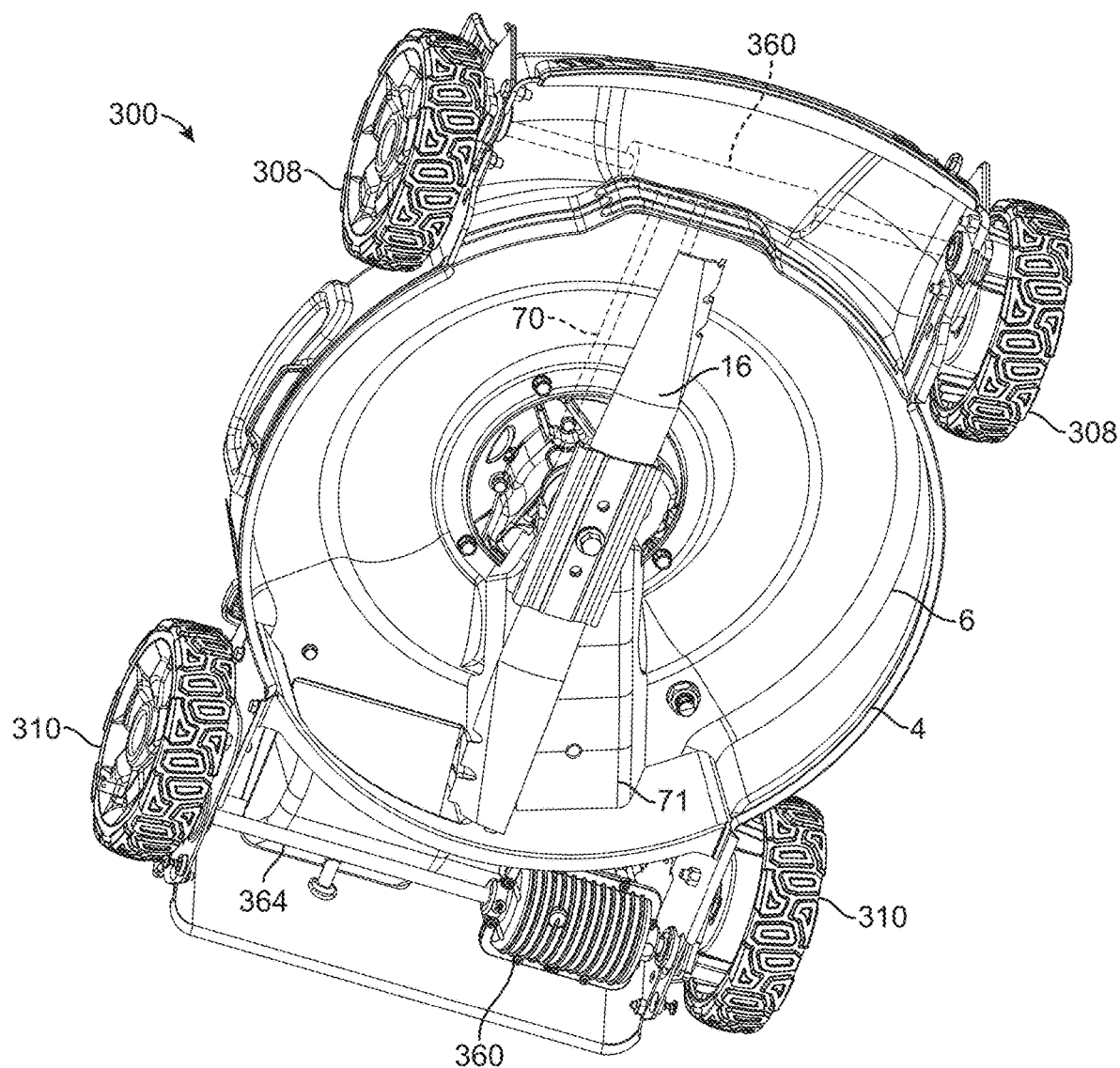
FIG. 6 is a perspective view of the underside of a mower cutting deck in accordance with another embodiment of this disclosure, the mower shown with a bidirectional, single (forward and reverse) transmission traction drive system.

While traction drive systems are shown in FIGS. 1-5 as utilizing discrete forward and reverse transmissions, such a construction is exemplary only as other traction drive systems are contemplated. For example, FIG. 6 illustrate a power equipment unit (e.g., self-propelled, walk power mower 300) that utilizes a traction drive system having a single, variable speed, bidirectional transmission 360 carried by the deck that alternatively powers one or more drive wheels (e.g., two rear wheels 310) to selectively propel the deck over the ground in both forward and reverse directions. While shown as being used to power the rear wheels 310, the mower 300 could, in addition or alternatively, include a bidirectional transmission (see broken line rendering of front transmission 360 in FIG. 6) powering the two front wheels 308. In still other embodiments, only one of the front and rear transmissions may be bidirectional, while the other transmission provides driving power in only a single (e.g., forward) direction. Other aspects of the mower 300 may be similar to the mower 2 (or 2') already described herein (e.g., the mower 300 may include the deck 4, engine 12 (see FIG. 1), blade 16, and handle (not shown, but see handles described elsewhere herein). Accordingly, further description of these features of the mower 300 is not provided herein.

Utilizing a power equipment unit incorporating a singular, bidirectional transmission 360 may provide various benefits over dual transmission configurations including, for example, reduced cost and weight. Moreover, a single transmission may also benefit from a comparatively simplified control system. For example, cables (e.g., such as the Bowden cables described above connecting the handle grip 32/32' to the transmissions) may require connection to only a single transmission, thereby simplifying cable routing/adjustment.

Figure 7A:
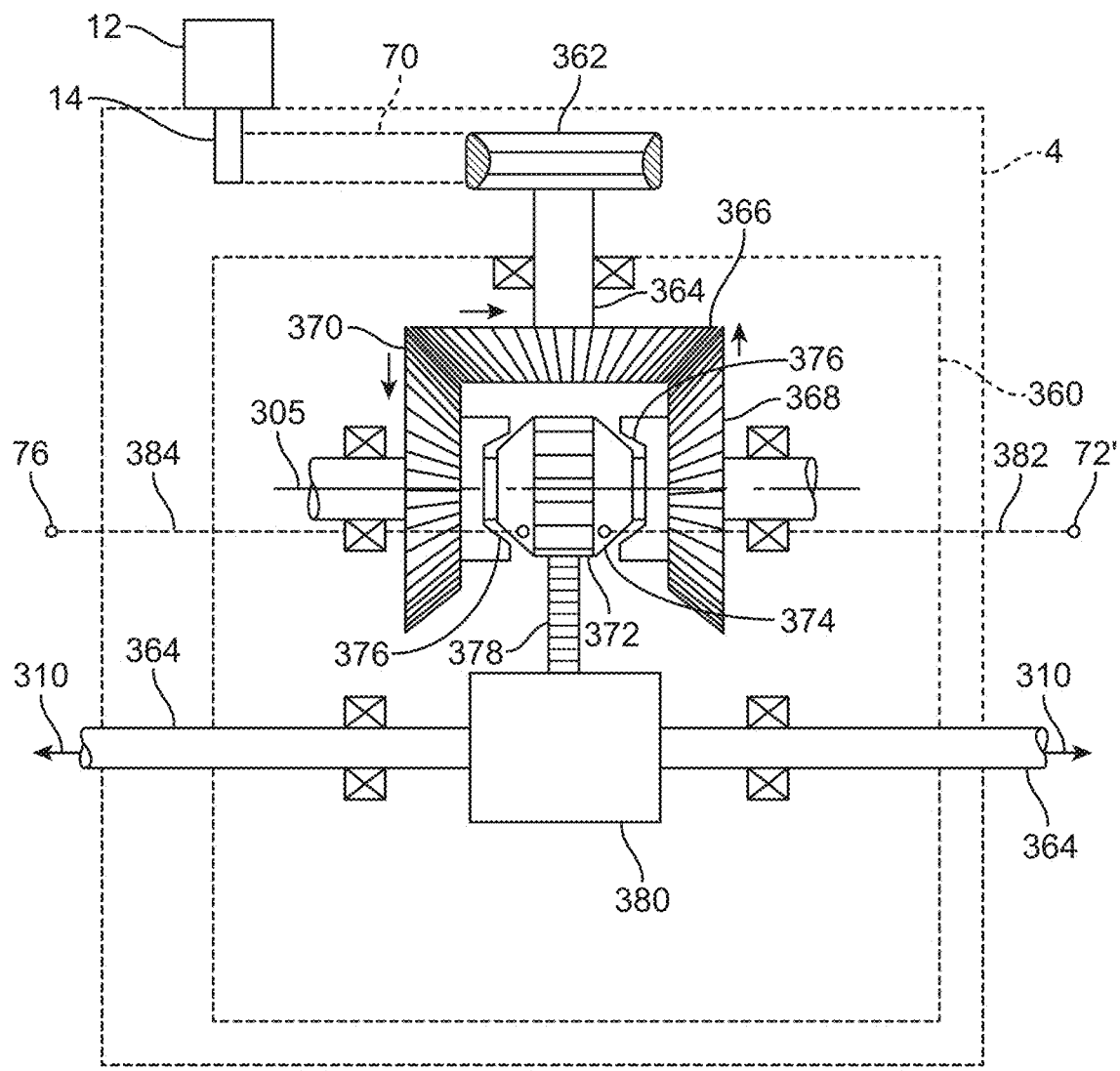

FIG. 7A diagrammatically represents a forward/reverse transmission 360 in accordance with one embodiment of this disclosure. While illustrated with some specificity, the transmission 360 illustrated in FIG. 7A is exemplary only as other bidirectional transmissions are certainly contemplated within the scope of this disclosure.

The transmission 360 may be carried by the deck 4 and may include an input sheave 362 powered by a belt 70 (belt is not illustrated in FIG. 6 as it is beneath cover 71, but see FIG. 3) connected to the drive shaft (see 14 in FIG. 3). The sheave 362 is fixed to a journaled shaft 364 having a bevel gear 366 such that, when the sheave 362 rotates, the bevel gear 366 rotates in the same direction.

The bevel gear 366 meshes with first (forward) and second (reverse) bevel gears 368, 370, which are each journaled for rotation about an axis 305 perpendicular to an axis of the shaft 364. As a result, when the input sheave 362 rotates, the first and second bevel gears 368, 370 also rotate about their axis 305, albeit in opposite directions.

A cone gear 372 may be located between the first and second bevel gears 368, 370. The cone gear may be selectively translatable between: contact with the first bevel gear 368; and contact with the second bevel gear 370. The cone gear 372 may include friction surfaces 374 on each side, the friction surfaces adapted to alternatively engage associated friction surfaces 376 of the first and second bevel gears. More specifically, when the cone gear 372 is displaced to the right in FIG. 7A such that its right-side friction surfaces 374 engage the friction surfaces 376 of the first bevel gear 368, the cone gear will rotate in a first direction ultimately corresponding to propulsion of the mower in the forward direction. Similarly, displacement of the cone gear to the left in FIG. 7A such that its left-side friction surfaces 374 engage the friction surfaces 376 of the second bevel gear 370 will cause the cone gear to rotate in a second opposite direction ultimately corresponding to propulsion of the mower in the opposite, reverse direction.

The cone gear 372 includes gear teeth that mesh with an axle gear 378 operatively connected to the drive wheel axle 364. As already described above, the axle 364 may include a differential 380 (diagrammatically illustrated) that allows each drive wheel to rotate independent of the other, i.e., during turns. While shown as incorporating the differential 380, other embodiments may use a solid axle without departing from the scope of this disclosure.

The cone gear 373 may be connected, via Bowden cables 382, 384 to the mower's control system. For example, with the control system shown in FIG. 5, the cable 382 may be connected between the cone gear 372 and the opening 72', while the cable 384 may be connected between the cone gear and the opening 76. As a result, when the operator moves the handle 36' (see FIG. 5) downwardly, the tab 74' may pivot such that the opening 72' moves rearwardly, displacing the cable 382 and causing the cone gear 372 to slide to the right in FIG. 7A. As the friction surfaces 374 of the cone gear engage the friction surfaces 376 of the first bevel gear 368, the cone gear will rotate in the first direction, causing the mower to be propelled in the forward direction.

Similarly, when the operator moves the handle 36' upwardly in FIG. 5, the tab 74' may pivot such that the opening 76 moves rearwardly, displacing the cable 384 and causing the cone gear 372 to slide to the left in FIG. 7A. As the friction surfaces 374 of the cone gear engage the friction surfaces 376 of the second bevel gear 370, the cone gear will rotate in the second direction, causing the mower to be propelled in the reverse direction.

Engagement of the cone gear 372 with either of the bevel gears 368, 370 may be proportional to the movement of the handle 36'. Accordingly, the speed of mower propulsion may be associated with the degree of movement of the handle 36'. That is to say, the speed of the mower 300 (in both forward and reverse directions) may be dependent upon how much force the operator applies to the handle 36'.

The forward/reverse transmission 360 shown in FIG. 7A may be powered, via belt 70, by the mower's prime mover 12 (see, e.g., FIG. 1), the latter of which may be an internal combustion engine, an electric motor, or another power source. That is to say, the transmission 360 may be powered by the same power source used to rotate the cutting member 16 (see, e.g., FIG. 6).

Figure 7B:
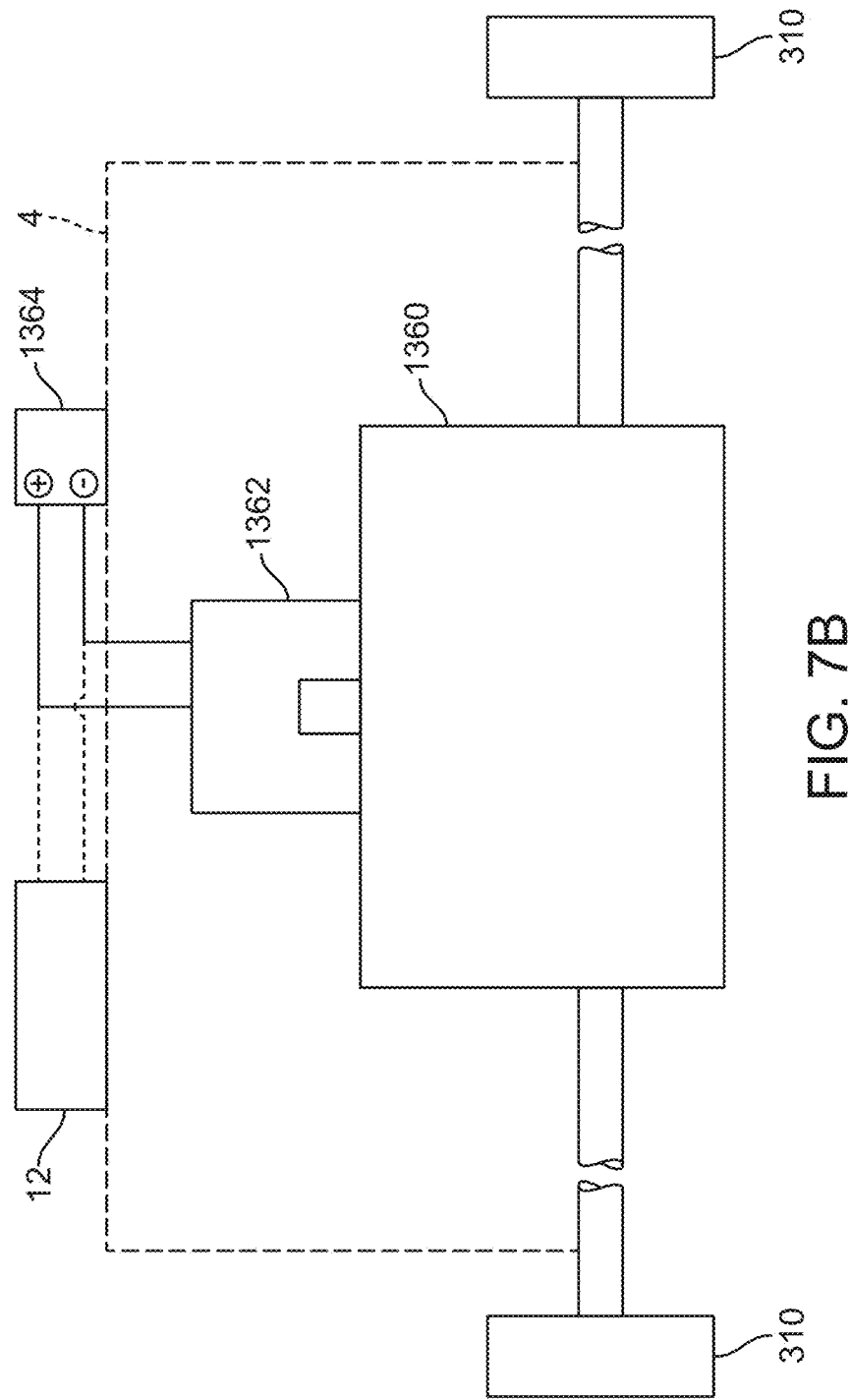

However, such a configuration is not limiting. For example, FIG. 7B illustrates a bidirectional transmission 1360 that is similar in many respects to the transmission 360 described above. Instead of receiving power from the prime mover 12, however, the transmission 1360 includes an independent propulsion motor 1362 connected to or integral with the transmission to provide power to the same. For instance, the motor 1362 may be an electric motor that is powered by an onboard battery system 1364 that may also provide power to the prime mover 12 (assuming the latter is configured as an electric motor). While the actual construction of the battery system 1364 may vary, it may in some embodiments include one or more lithium-based battery cells as is known in the art. Alternatively, the motor 1362 and prime mover 12 could be powered by separate and independent battery systems. Still further, one or both of the motor 1362 and prime mover 12 could receive AC power from an external power source.

Figure 7C:
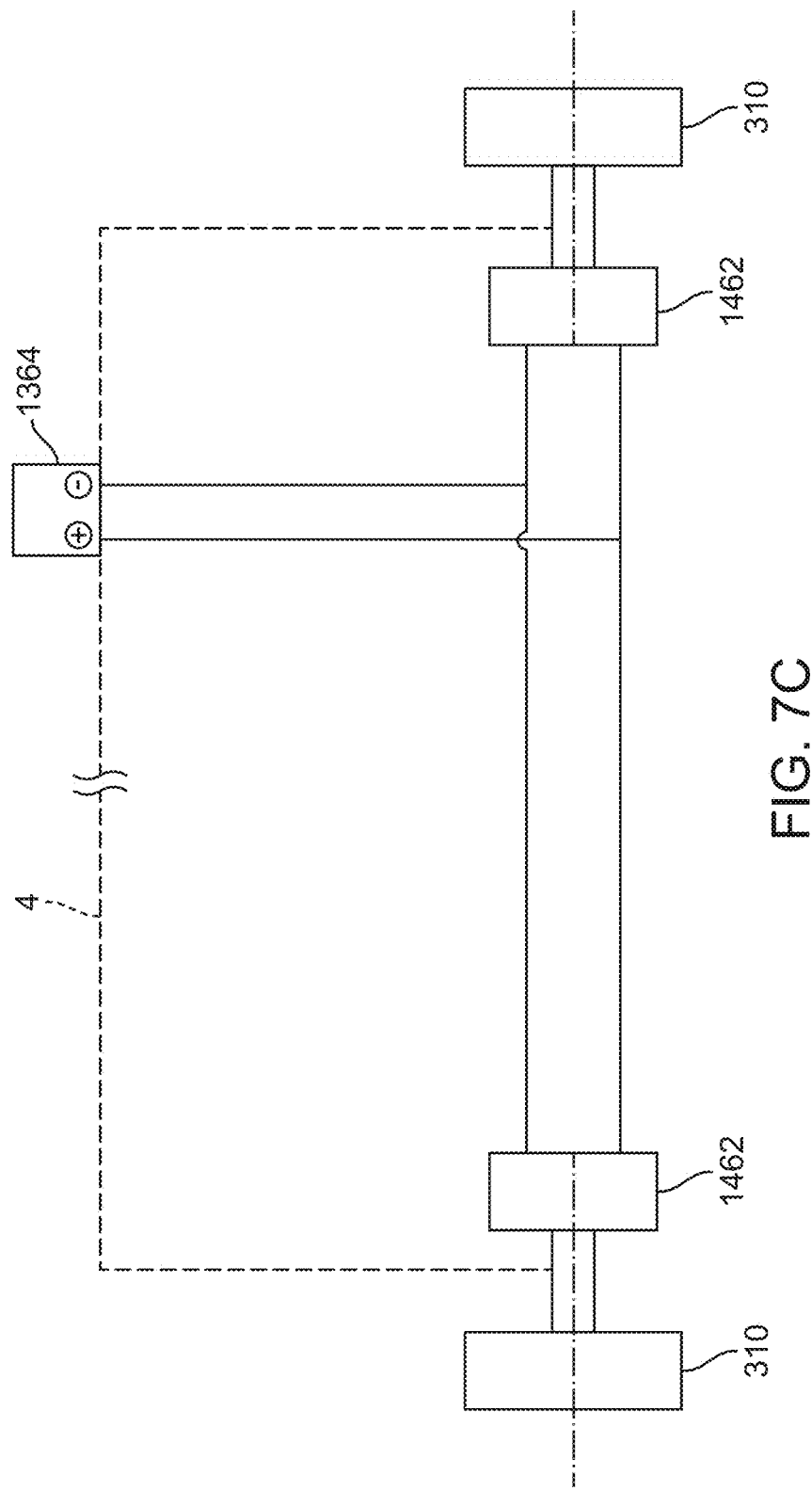

In yet another potential drive system, the transmission may be configured as one or more, e.g., two, independent electric motors 1462 directly coupled to the mower drive wheels (e.g., one to each of the rear wheels 310) as shown in FIG. 7C. As with the motor 1362, the motors 1462 may be powered by a battery system 1364 that is either dedicated to mower propulsion, or is shared with the prime mover 12 (not shown in FIG. 7C). Each electric motor 1462 and 1362 may, as is known in the art, be reversible to provide the desired forward/reverse propulsion.

One benefit of the electric transmissions 1360, 1462 is that no mechanical interconnection is required between the handle and the transmission. Instead, a cable or wire harness adapted to carry electrical signals (or an equivalent wireless protocol) may be used to provide a command signal to the electric motors based upon a position of the handle. For example, the handle may include a position sensor (e.g., linear variable differential transducer) or similar device that may convert a physical position of the handle into an appropriate electrical signal that is ultimately provided to the electric motors. In some embodiments, a microcontroller may be provided to receive, as inputs, the signals representing the position of the handle. The microcontroller may then process these inputs and produce corresponding output commands to the electric motor(s).

Accordingly, various bidirectional transmission configurations, now known or later developed, are certainly contemplated within the scope of this disclosure.

Figure 8:
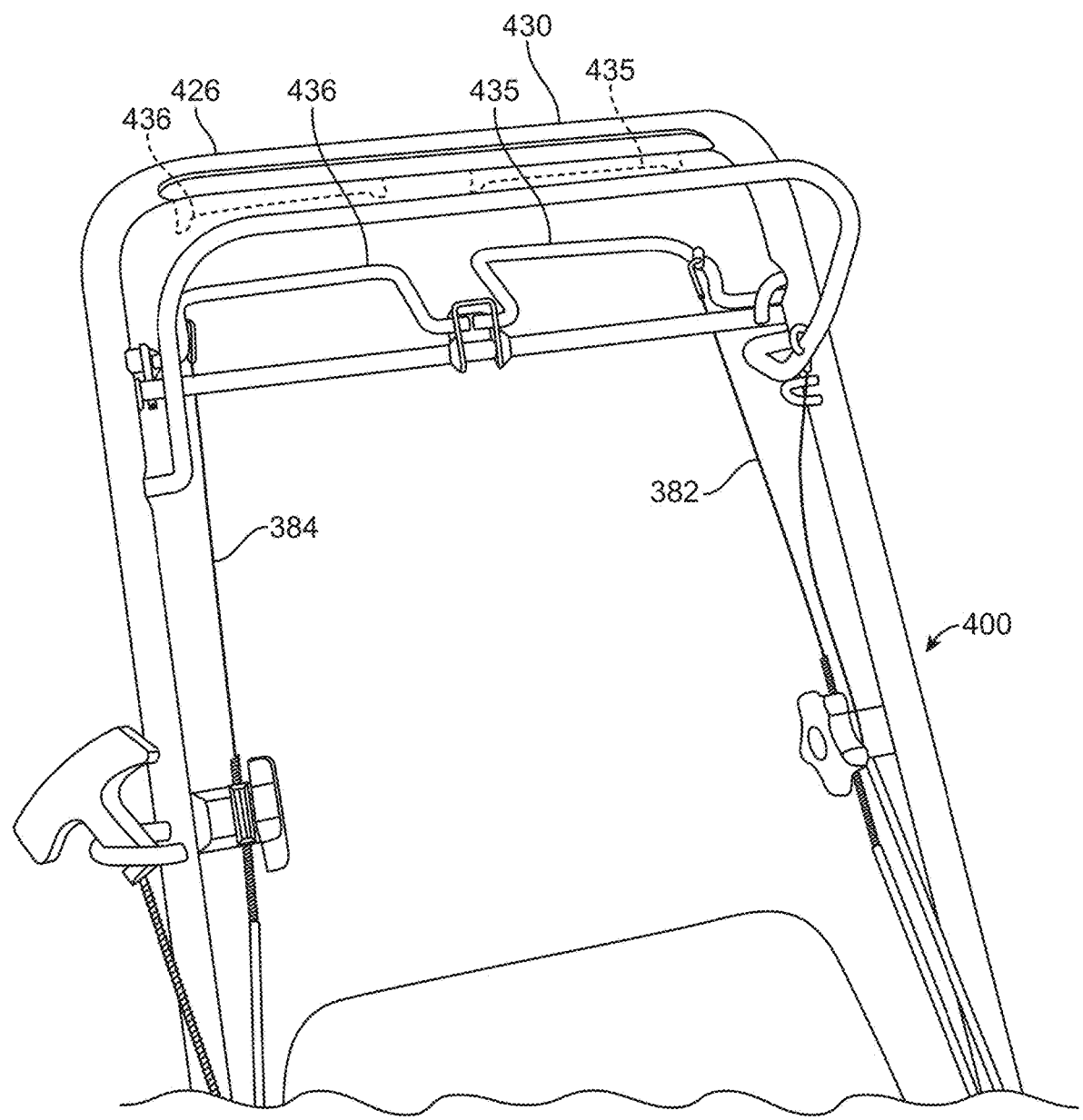
FIG. 8 is a perspective view of a portion of an exemplary handle for use with the mower of FIG. 6, the handle including a forward bail and a separate reverse bail.

While described above in the context of the handle 36' of FIG. 5, those of skill in the art will recognize that the handle 36 of FIG. 2 could also be utilized with slight modification with the mower 300. Moreover, control systems other than the handles 36 and 36' are also contemplated. For example, FIG. 8 illustrates a mower 400 having a handle 426 that incorporates two independently movable control members, e.g., first and second bails 435 and 436. The bails 435 and 436 are each movable between a neutral position (corresponding to a neutral mode of the drive system), and an engaged position (corresponding to a powered mode of the drive system). The bails may be connected by cables 382 and 384, respectively, to the transmission 360 (not shown in FIG. 8, but see FIG. 7A). As a result, movement of the bail 435 from its neutral position to its engaged position translates the cone gear 372 to the right in FIG. 7A, resulting in forward mower propulsion (e.g., forward powered mode), while movement of the bail 436 from its neutral position to its engaged position translates the cone gear 372 to the left in FIG. 7A, resulting in reverse mower propulsion (e.g., reverse power mode). In one embodiment, the engaged position of both bails is achieved by pivoting the bail (about the handle) until it rests against the cross member 430 as indicated in broken lines in FIG. 8.

The bails 435, 436 may include an interlock that prevents engagement of one bail unless the other is in a neutral position. In other embodiments, the diametrically opposing forces applied to the cone gear 372 by the cables 382 and 384 (see FIG. 7A) may effectively negate the need for such an interlock as the bail with the highest operator engagement force will determine the direction/speed of mower propulsion.

As indicated above, the mower 300 may include the single forward/reverse transmission 360 (or 1360, 1462) at the rear axle to effectively provide driving power to the rear wheels 310. Providing both forward and reverse operation at the rear axle is beneficial as, for example, the rear wheels typically bear a substantial portion of the mower weight and further allow for both forward and reverse propulsion even when the front wheels 308 are lifted off the ground (e.g., during a turn). However, the forward/reverse transmission 360 (or 1360, 1462) could alternatively be located at the front axle in other embodiments. Still further, the mower 300 could provide a forward/reverse transmission at both front and rear axles (see, e.g., broken line transmission 360 in FIG. 6), or a forward/reverse transmission at one (e.g., rear) axle, and a forward-only transmission at the other (e.g., front axle). The latter configuration would provide not only powered forward and reverse propulsion, but also all-wheel drive when operating in the forward direction.

Figure 9:
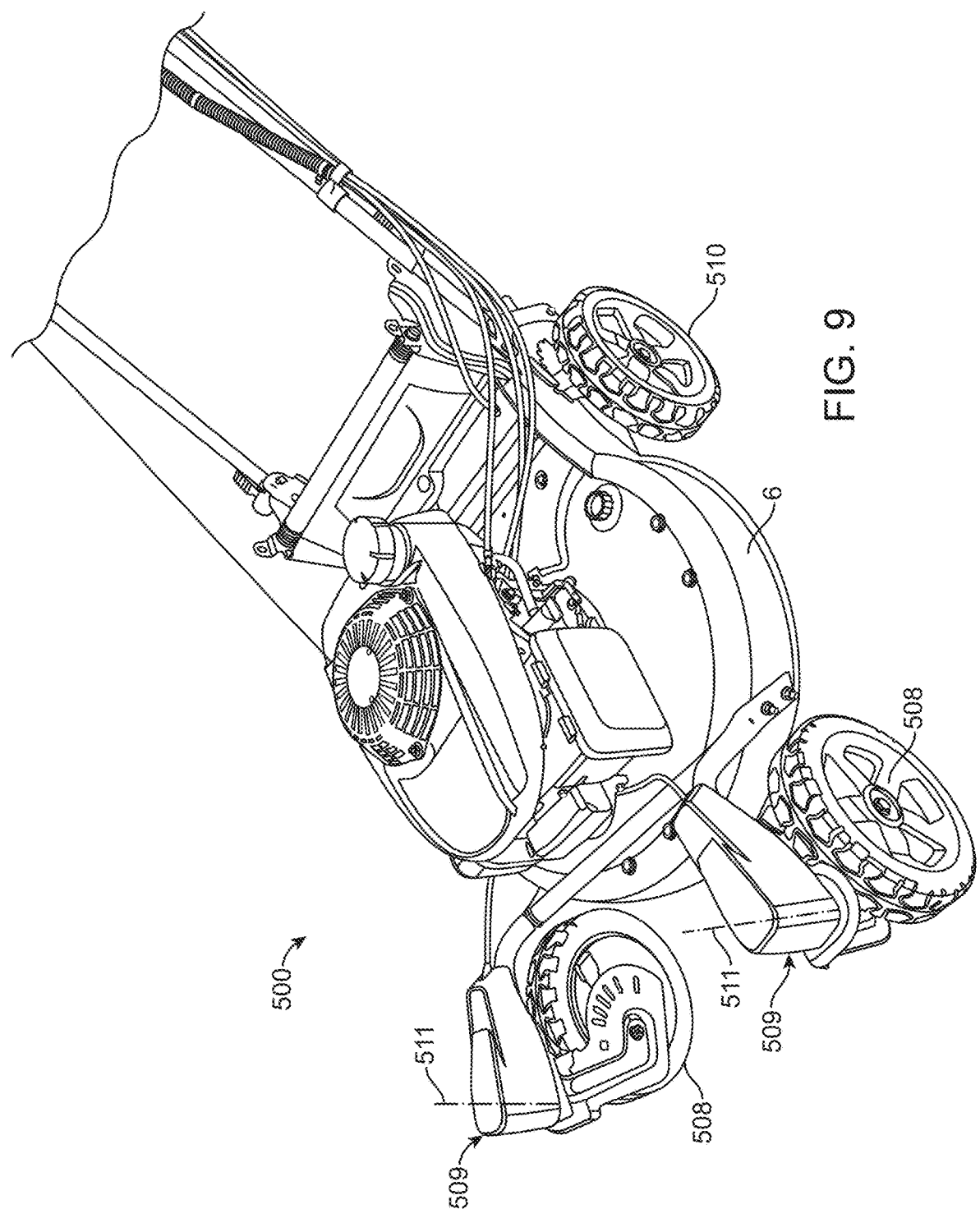
FIG. 9 is a perspective view of a mower in accordance with another embodiment of the present disclosure, the mower including castering front wheels.

FIG. 9 illustrates a mower 500 in accordance with another embodiment of this disclosure. The mower 500 may be similar in many respects to the mower 2, 2', 300, and 400 already described herein. However, the mower 500 differs in that the two front wheels 508 each form part of a caster assembly 509 having a caster arm rotationally connected to the deck so that each front wheel assembly, and thus, its associated front wheel, is permitted to caster or rotate about a vertical caster axis 511 relative to the deck 6. With forward/reverse propulsion provided by the rear wheels 510, castering front wheels 508 may provide the mower 500 with improved maneuverability by, for example, reducing or even eliminating the need to lift the front wheels during turns. The mower 500 may include any one of the handles described elsewhere herein.

While various traction drive configurations are described and illustrated in FIGS. 1-9, those of skill in the art will understand that other embodiments are certainly possible without departing from the scope of this invention. Moreover, features of the various embodiments described may be combined/substituted with one another to produce yet even additional embodiments. Accordingly, the embodiments described and illustrated herein are exemplary only.

During reverse mower operation, the force vector applied by the operator to the mower handle (e.g., which results in an applied moment to the handle about the handle/deck attachment point) may reverse. This reversal may ultimately result in a downward force being applied to the mower handle. In some instances, this downward force may cause the front of the deck to lift upwardly. As described below, embodiments of the present disclosure may address such lifting by utilizing a handle that provides a degree of float during mower operation.

FIGS. 10A-14 illustrate a walk power mower 200 in accordance with another embodiment of the present disclosure. With the exceptions noted below, the mower 200 may be mostly identical to the mower 2 (or 2' or 300) already described herein. For example, the mower 200 may include a cutting deck 204 that may be self-propelled, i.e., it may include a variable speed traction drive system having one or more transmission(s) carried by the deck as described herein. The drive system may be capable of selectively providing driving power to one or more of the wheels in both a forward and a reverse direction. Alternatively, the mower 200 may incorporate a conventional transmission (e.g., rear-wheel drive, front-wheel drive, or all-wheel drive) that is capable of selectively providing driving power to one or more of the wheels in only a single (e.g., forward) direction. For brevity, aspects of the mower 200 that are either commonly known in the art, or that are already described herein above, are not further described below.

Figure 10A:
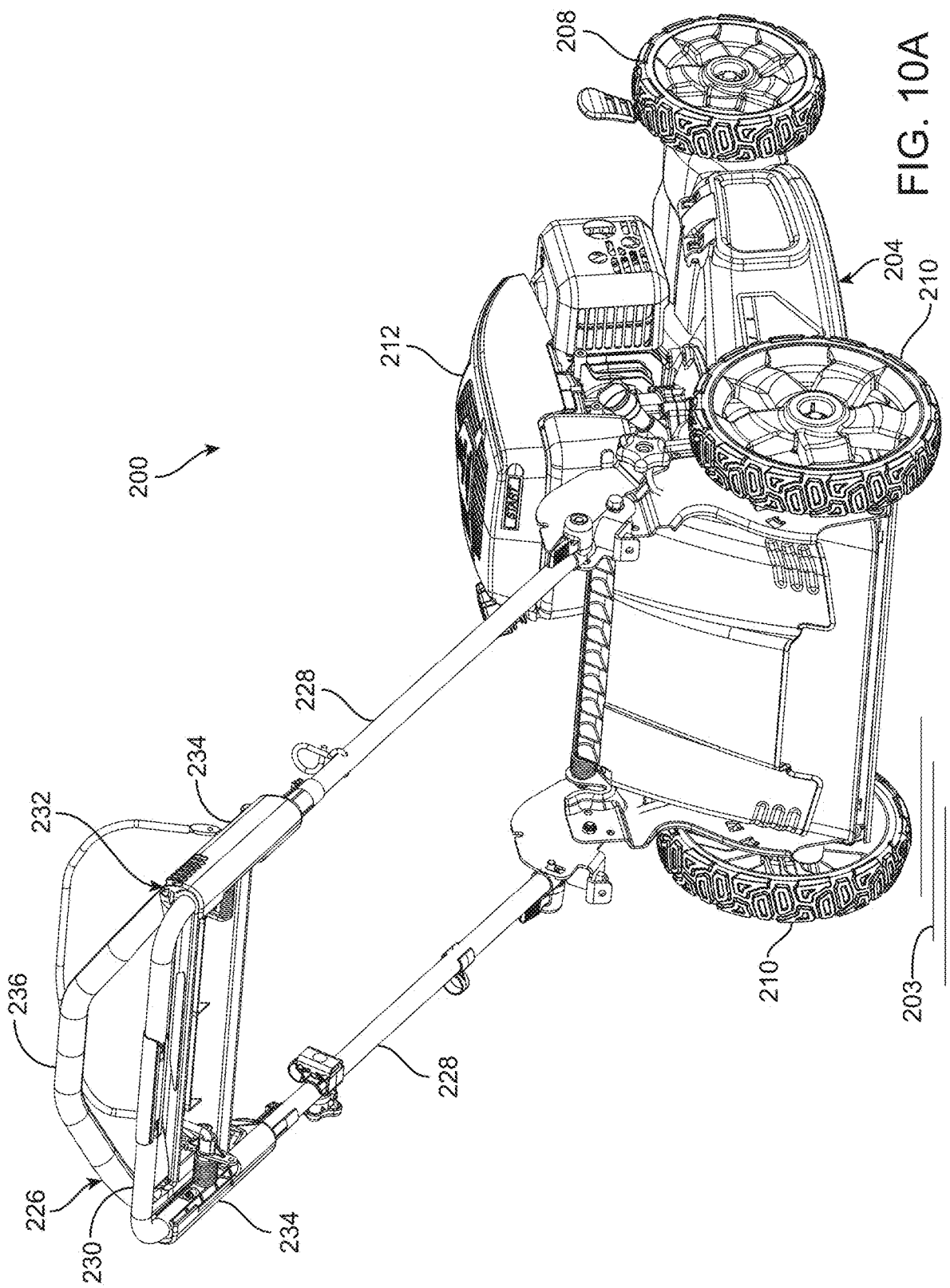
Figure 10B:
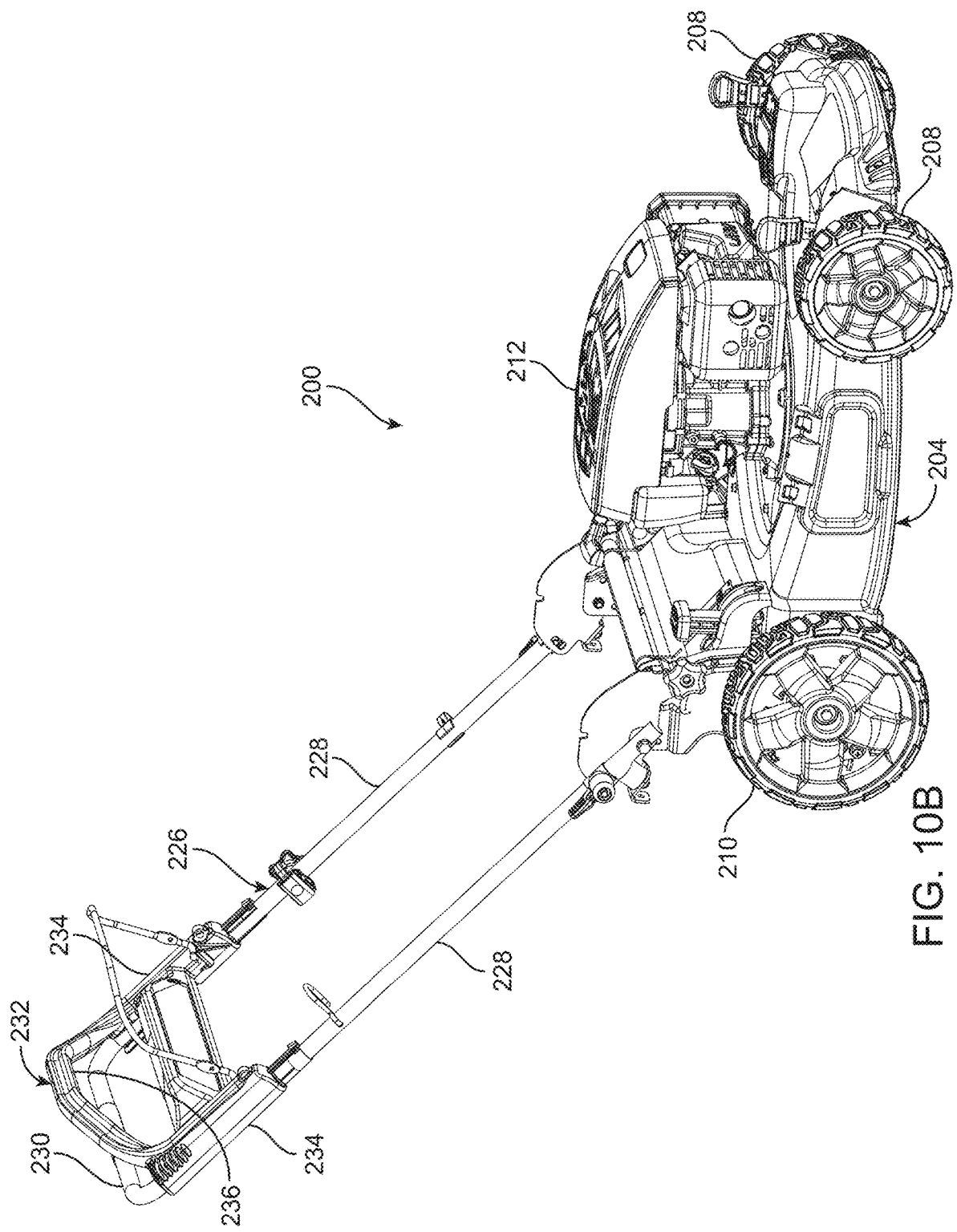

As shown in FIGS. 10A-10B, the grass cutting deck 204 is supported upon the ground 203 by a front wheel (e.g., a pair of ground-engaging front wheels 208) and a rear wheel (e.g., a pair of ground-engaging rear wheels 210). Again, the traction drive system may drive at least one of the front wheels and/or rear wheels forwardly to propel the mower 200 as it traverses the ground 203 in a forward direction, while the same or different wheel(s) may optionally be driven rearwardly to propel the mower in the reverse direction as already discussed herein. In other embodiments, the wheels of the mower may be undriven, i.e., the mower may move under operator push-power only.

The deck 204 may further support a prime mover 212 such as an electric motor or gasoline-powered engine. The prime mover may power not only the drive wheels of the mower, but also a cutting blade 16 (see FIG. 3) operable to rotate within the deck.

A handle 226 extends upwardly and rearwardly from the deck 204 as shown in FIGS. 10A-10B. As with the handle 26 of the mower 2, the handle 226 may include a pair of laterally spaced-apart and parallel handle members or tubes 228 extending upwardly and rearwardly from the cutting deck. Each handle tube includes an upper end forming a grip area, e.g., cross member 230 and/or handle grip 232. Lower ends of each handle tube 228 may be pivotally attached to the deck 204, e.g., to a rear portion of the deck. While shown as incorporating two parallel handle tubes, mowers with handles formed from a single handle member or tube are also contemplated.

The handle 226 of the exemplary mower 200 may include a U-shaped handle grip 232 having a pair of laterally spaced legs 234 connected by an upper cross bar 236 at or near the upper ends of the handle members. As with the mower 2, legs 234 of the handle grip 232 may be telescopically attached near the upper ends of the handle tubes 228 for sliding movement (translation) relative thereto. Thus, handle grip 232, like the grip 32 described above, forms a control system or member slidable downwardly (and optionally upwardly) on the handle tubes 228 as the user walks forwardly (and optionally, rearwardly) while gripping the cross bar 236 with the user's hands. That is to say, the control member of the handle 226 is operable to engage the variable speed traction drive system to selectively propel the cutting deck 204 in one or both of the forward and reverse directions in a manner already described herein with respect to the mowers 2 and 2'.

Of course, in other embodiments, the handle 226 may include an alternative control member for interfacing with the traction drive system to control mower propulsion, or it may completely lack any such control member/traction drive system (i.e., when configured as a push-powered mower).

Figure 11:
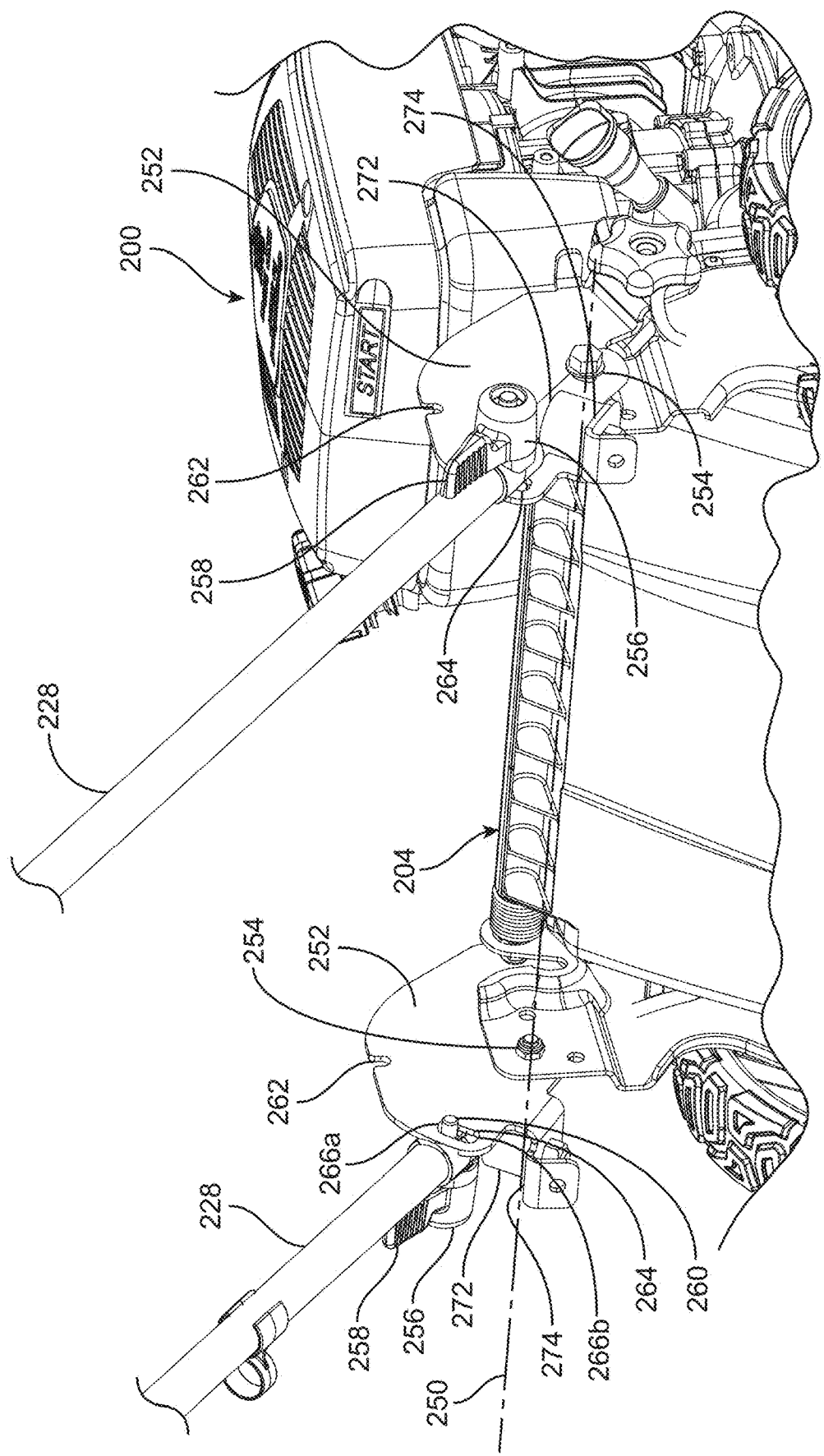
FIG. 11 is an enlarged view of a portion of the mower of FIGS. 10A-10B.

The lower ends of the handle tubes 228 may pivotally attach to the deck 204 such that the handle 226/handle tubes 228 may pivot about a horizontal transverse pivot axis 250 (e.g., an axis that is transverse to a direction of forward or reverse travel of the deck) as shown in FIG. 11. To accommodate this pivotal connection, the mower 200 may include left and right upright float plates 252 associated with the left and right handle tubes 228, respectively. The plates 252 may each define an aperture operable to receive a fastener (e.g., pin/nut 254) passing through an aligned aperture in its associated handle tube 228. The pins/nuts 254 thus define the pivot axis 250 about which the handle (e.g., handle tubes) may pivot.

Each handle tube 228 may also include a handle latch 256. Each latch may include a lever 258 that is rotatable (e.g., 90 degrees) to allow extension and retraction of a latch pin 260. In the operating position illustrated in FIG. 11, each pin 260 may be engaged with a slot 264 formed in the associated plate 252. The slots constrain the handle 226 (handle members 228) not to a singular position like the notches 262 (described below), but rather allow the handle 226/tubes 228 to pivot, relative to the deck 204, between: an upper stop 266a (upper end of the slot 264) corresponding to the handle being in a first operating orientation R (see FIG. 14); and a lower stop 266b (lower end of the slot) corresponding to the handle being in a second operating orientation B (see also FIG. 14). The upper and lower stops 266a, 266b thus define an operating range of pivotal motion of the handle (i.e., of the handle tubes). In one embodiment, the operating range of pivotal motion is at least about 5 degrees (i.e., about 5 degrees or more) of rotation about the pivot axis 250. For example, in some embodiments, a range of about 5-20 degrees, or a range of about 8-12 degrees, is contemplated.

Figure 14:
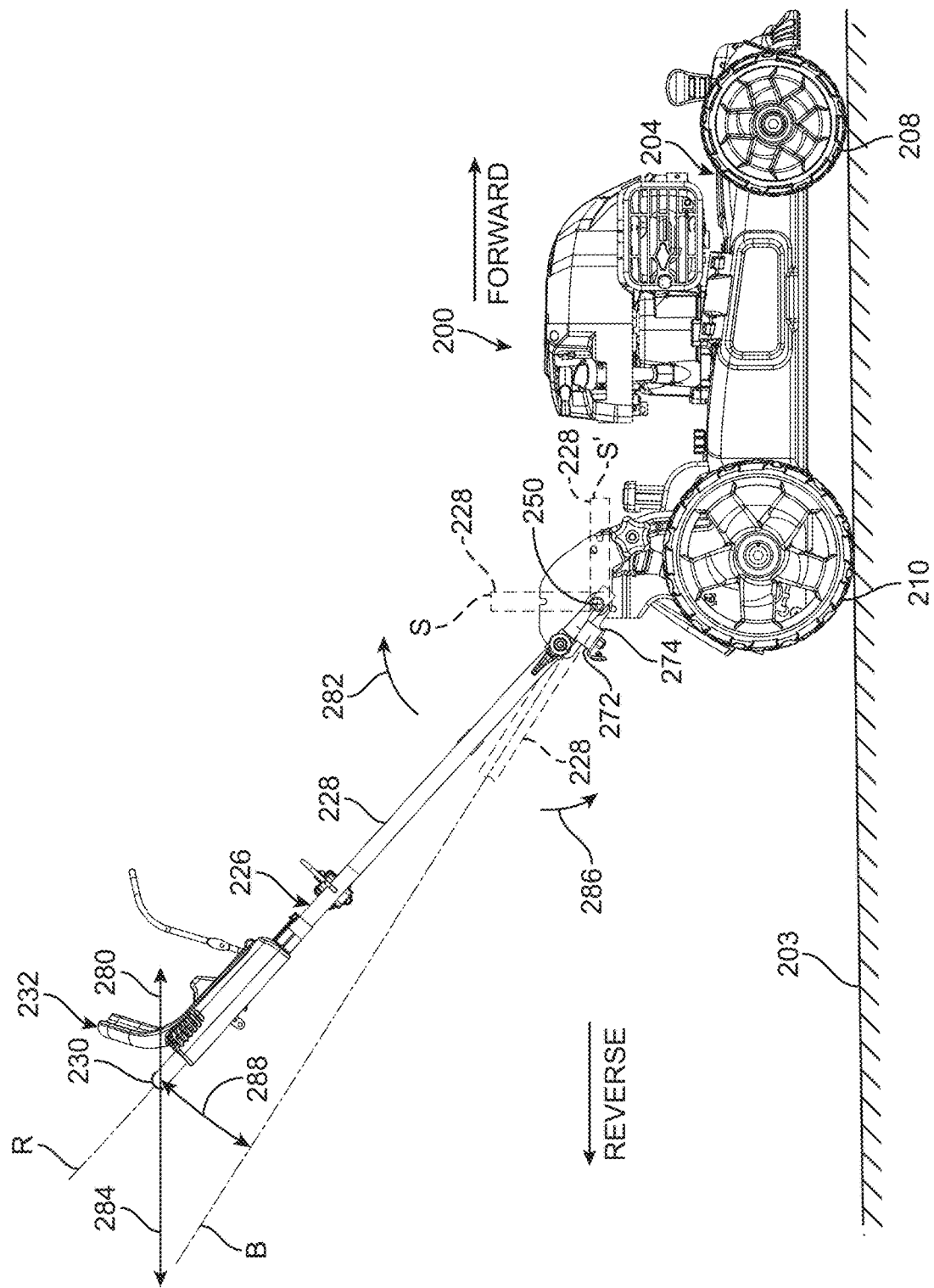
FIG. 14 is a side elevation view of the mower of FIGS. 10A-10B.

By retracting the latch pins 260, the handle 226/handle members 228 may also be moved from the operating orientations to a third or storage orientation S shown in broken lines in FIG. 14. In the storage orientation S, the handle 226/handle tubes 228 is positioned generally vertically to reduce the footprint of the mower during non-use. The handle 226 may be latched in the storage orientation by extending the pins 260 into engagement with associated notches or openings 262 formed on the plates 252 (see FIG. 11). As one can appreciate, the storage orientation S is outside of the operating range of pivotal motion defined by the slots 264 and stops 266a, 266b. While shown as placing the handle 226/handle members 228 in a generally vertical storage position, such a configuration is not limiting. For instance, other embodiments may locate the notches 262 (or, alternatively, provide an additional set of notches 262) to allow for handle 226/handle member 228 storage at a different angular orientation. One such orientation may place notches 262 such that the handle 226/handle members 228 extend forwardly and generally parallel to the ground 203 (see FIG. 14) when in a storage orientation S'.

Figure 12:
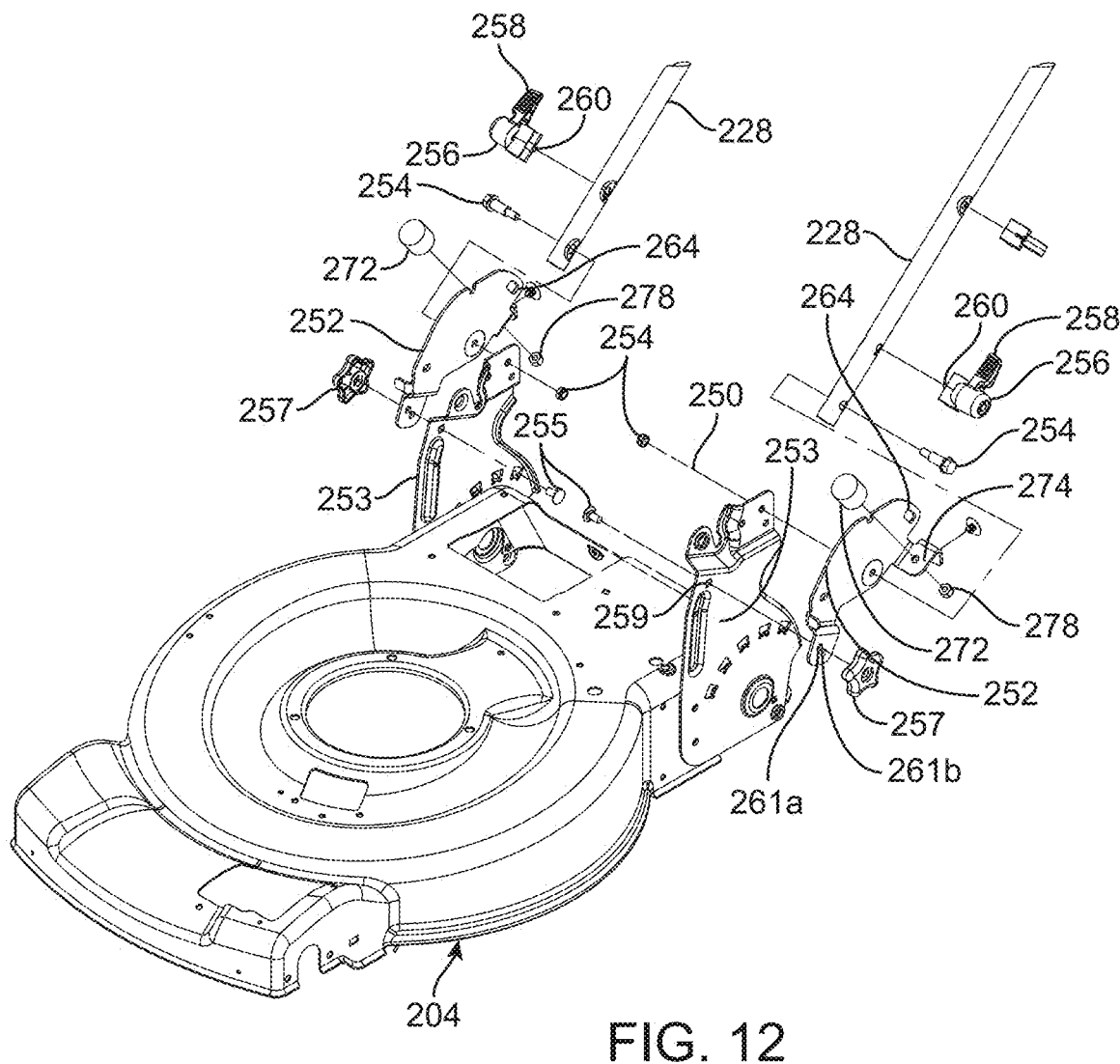
FIG. 12 is an exploded perspective view of a portion of the mower of FIGS. 10A-10B.

As shown in the exploded view of FIG. 12, each plate 252 may rotatably attached to an upright flange 253 of the mower deck via its associated pin/nut 254 such that it may rotate about the transverse pivot axis 250. To rotationally secure each plate 252 in place relative to its associated flange 253, a fastener 255 and threaded knob 257 may be provided. The fastener 255 may be inserted through an aperture 259 in the flange 253 and into one of two (or more) holes 261a, 261b formed in the bracket 252. By pivoting the plate until the appropriate hole 261a, 261b aligns with the aperture 259, the mower may provide varying handle operating heights to accommodate a broad range of users. Once the fastener 255 is inserted through the desired hole 261a or 261b of each plate 252, the threaded knob 257 may be secured to the fastener 255 to lock the plate 252 in place.

With reference now to FIGS. 11-14, the mower 200 may also include a handle float system adapted to bias the handle (e.g., the handle members) toward the upper stop 266a. In one embodiment, the float system includes a resilient member, e.g., left and right resilient members 272, operatively positioned between each lower stop 266b of the cutting deck and its respective handle member 228. For example, in the illustrated embodiment, the left and right resilient members 272 may be positioned such that they abut a lower side of the left and right handle tubes 228, respectively, when the handle is at rest (when the handle is in the operating orientation R (see FIG. 14) and no user loads are applied to the handle). In some embodiments, the resilient members 272 may bias the tubes 228 against their respective upper stops 266a. However, in other embodiments, the resilient members may be configured to bias the handle members to a location that is at or near (e.g., slightly short of) the upper stops when the handle is at rest.

The term "resilient member," as used herein, includes most any device that is able to deform, displace (e.g., displace a contained fluid), distort, or contract under load, and then spontaneously return to (or near) its original configuration when the load is removed. Thus, in addition to the neoprene cylinder configuration described below, other resilient members, e.g., a pneumatic spring, a mechanical or fluidic shock absorber, etc., are also contemplated within the scope of this disclosure.

Figure 13:
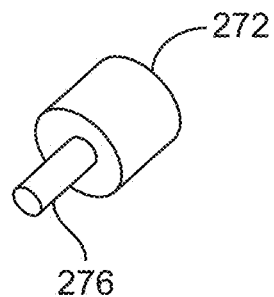
FIG. 13 is a perspective view of a resilient member for use with the mower of FIGS. 10A-10B.

To secure each resilient member 272 in place, the mower deck 204, e.g., the plates 252, may each define a seat 274. In the illustrated embodiment, each seat is formed by a bent tab of its associated plate 252 (see FIG. 12). The seat 274 may define an aperture adapted to receive an integral threaded stud 276 of the member 272 as shown in FIGS. 12 and 13. The stud 276 may pass through the aperture in the seat 274 and be secured relative to the plate 252 with a nut 278.

Each member may be constructed of a resilient elastomeric material. For example, while not wishing to be bound to any specific configuration, each member 272 may be a neoprene disk or cylinder having a durometer of 60 Shore A. In the illustrated embodiment (see, e.g., FIG. 13), the cylinder may have a height of about one inch and a diameter of about 1.25 inches. However, members of other materials, hardness, size, and geometry are certainly contemplated.

During operation of the mower 200 over the ground 203, the handle 226 may be used to control forward propulsion at already described above with reference to the mower 2 and 2'. For example, as shown in FIG. 14, the user may apply a force 280 that either: displaces the handle grip 232 downwardly along the handle tubes 228 to engage the traction drive system; or, where the mower is push-powered, pushes against the cross member 230 sufficiently to move the mower forwardly. In the case of the former, as the user walks forwardly and applies this input force 280 to the handle grip 232, the handle grip moves from a neutral position (wherein the traction drive system is inactive), to a first engaged position, causing one of the transmissions to engage and propel the mower in the forward direction.

As this user-applied force 280 is offset from the deck 204, it may also produce a pivoting force on the handle 226/handle tubes 228 (about the axis 250 (see also FIG. 11)) in a clockwise direction 282 as shown in FIG. 14. However, the upper stop 266a of the slot 264 (see also FIG. 11) will effectively limit this pivotal movement of the handle (relative to the deck 204). As stated above, however, some minimal pivotal movement in the direction 282 may be accommodated before contact occurs between the pin 260 and the upper stop 266a. However, once the hard stop 266a is contacted, further movement of the handle 226 (relative to the deck) in the direction 282 may be constrained.

When the user instead applies a pulling input force 284 to the mower handle 226 (e.g., directly to the handle grip 232) in a reverse direction, the handle grip 232 may move upwardly along the handle members from the neutral position to a second engaged position. In the second engaged position, the traction drive system may activate for propulsion in the reverse direction. Moreover, as this reverse motion occurs, the handle 226/handle members 228 may pivot (about the pivot axis 250) in a counterclockwise direction 286, i.e., toward the lower stop 266b (see FIG. 11) corresponding to the second operating orientation B of the handle. As this pivotal movement occurs, each handle tube 228 may compress and resiliently deform its associated member 272. As a result, the moment of the handle 226 is reacted, at least initially, by compression of the members 272, allowing substantial downward movement of the handle (e.g., cross member 230/hand grip 232) to occur and be isolated (at least initially) from corresponding upward movement of the mower's front wheels 208. Of course, once the members bottom out on the hard stop 266b (see FIG. 11), further movement of the handle 226 in the direction 286 may begin to elevate the mower's front wheels 208.

With a mower 200 like that described herein incorporating two neoprene members 272 as described above, the handle 226 may pivot about its pivot axis 250 (in the direction 286) about 10 degrees from its at rest position R (shown in solid lines in FIG. 14) to a bottom position B before the front wheels 208 would begin to rise. While varying geometries are possible, one embodiment of the mower 200 may use a handle that is roughly 32 inches long (measured from a centerline of the cross member 230 to the pivot axis 250). With this construction, the cross bar 230 may move a linear distance (e.g., along an arc 288) of approximately 5-10 inches, e.g., 6 inches, as the handle tubes move from the upper stop 266a to the lower stop 266b (see FIG. 11). Of course, depending on the stiffness/configuration of the members, the weight and weight distribution of the mower, and the magnitude of the force 284, the members may effectively form the lower stops. That is to say, the members 272 may reach a maximum deflection before the pins 260 contact the lower stops 266b. However, in other embodiments, the members may continue to compress up and until the lower stops 266b are contacted by their respective pins 260.

Floating handles such as those described herein may thus allow at least some degree of downward movement of the handle to occur without causing associated lifting of the front wheels. As a result, mowers that utilize a sliding control member to initiate rearward propulsion (e.g., like the handle 226 described herein) may permit rearward/downward handle movement without causing front wheel lifting (at least during typical and expected operation). This advantage may be especially useful for mowers that incorporate reverse drive at the front wheel axle. However, even for mowers that provide no powered reverse operation, floating handles in accordance with embodiments of the present disclosure may still assist in keeping the front wheels in contact with the ground during reverse pulling of the mower.

While described herein in the context of a four-wheel mower, such a configuration is exemplary only. For instance, it is contemplated that embodiments of the present disclosure may find application to mowers having tri-wheel configurations (e.g., having only a single front wheel and/or a single rear wheel), as well as to most any other multi-wheel/multi-axle configuration. Yet further, mowers using ground-engaging members other than wheels (e.g., a rear roller) are also possible. Still further, embodiments of the present disclosure may find application to mowers entirely lacking physical ground-engaging members. For example, hover mowers, which float above the ground on a cushion of air generated by the mower, may benefit from the concepts (e.g., the biased handle) described herein. Those of skill in the art will further realize that embodiments of the present disclosure may also find application to walk-behind power equipment other than lawn mowers having a ground-traversing tool housing other than a cutting deck including, for example, aerators, wheeled debris blowers, cultivators, and the like.

Various modifications will be apparent to those skilled in the art. Thus, the scope of this invention is not to be limited to the details of the various embodiments described herein, but shall be limited only by the appended claims, and equivalents thereof.

What is claimed is:

1. A power equipment unit comprising:
a housing supported upon the ground by at least a front wheel and a rear wheel of which one or both form a drive wheel of the unit, the housing adapted to traverse the ground in both a forward direction and an opposite, reverse direction;
a prime mover carried by the housing, the prime mover operatively connected to a ground-working tool associated with the housing; and
a variable speed traction drive system carried by the housing, the traction drive system comprising:
a bidirectional transmission operatively connected to the drive wheel, the transmission operable to selectively rotate the drive wheel to propel the housing over the ground; and
a control system comprising:
a handle grip operatively connected to the transmission and movable relative to a handle member extending upwardly and rearwardly from the housing, wherein the handle grip activates the transmission to power the drive wheel for movement of the housing in the forward direction when the handle grip is moved in a first direction, and wherein the handle grip activates the transmission to power the drive wheel for movement of the housing in the reverse direction when the handle grip is moved in a second direction opposite the first direction; and
a position sensor adapted to produce an electrical signal indicative of a physical position of the handle grip relative to the handle member, wherein the electrical signal is ultimately provided to the transmission.

2. The power equipment unit of claim 1, wherein the prime mover is further connected to the transmission to provide power to the same.

3. The power equipment unit of claim 1, wherein the transmission comprises one or more electric motors.

4. The power equipment unit of claim 1, wherein the housing comprises a cutting deck and the ground-working tool comprises a rotating cutting member operatively powered by the prime mover.

5. The power equipment unit of claim 1, wherein the front wheel forms part of a caster assembly, the caster assembly mounted to the housing such that the caster assembly pivots, relative to the housing, about a caster axis.

6. The power equipment unit of claim 1, wherein movement of the handle grip relative to the handle member comprises translation of the handle grip along the handle member.

7. The power equipment unit of claim 1, further comprising first and second rear wheels each configured as drive wheels, and wherein the transmission comprises first and second electric motors coupled to the first and second rear wheels, respectively.

8. A walk power mower comprising:
a deck supported upon the ground by front wheels and rear wheels, the deck adapted to traverse the ground in both a forward direction and an opposite, reverse direction, wherein one or more of any of the front wheels and the rear wheels operate as a powered drive wheel of the mower;
a handle comprising a handle member extending from the deck, wherein the handle member includes a first end and a second end, the second end operatively attached to the deck;
a prime mover carried by the deck, the prime mover operatively connected to a cutting member;
a variable speed, bidirectional transmission carried by the deck, wherein the transmission is adapted to selectively rotate the drive wheel to propel the deck over the ground; and
a control system comprising:
a handle grip positioned at or near the first end of, and movable relative to, the handle member; and
a position sensor associated with one or both of the handle grip and the handle member, the sensor adapted to generate an electrical signal indicative of a physical position of the handle grip relative to the handle member,
wherein the electrical signal is provided to the transmission such that the handle grip operatively activates the transmission to power the drive wheel for movement of the deck: in the forward direction when the handle grip is moved from a neutral position directionally toward the deck; and in the reverse direction when the handle grip is moved from the neutral position directionally away from the deck.

9. The mower of claim 8, wherein each front wheel forms part of a front wheel assembly that further comprises a caster arm, the caster arm rotationally connected to the deck so that each front wheel assembly, and thus its associated front wheel, rotates about a caster axis relative to the deck.

10. The mower of claim 8, wherein movement of the handle grip relative to the handle member comprises translation of the handle grip along the handle member.

11. The mower of claim 8, wherein the rear wheels comprise first and second rear wheels, and wherein the transmission is connected to both of the first and second rear wheels.

12. The mower of claim 11, wherein the transmission comprises:
a first electric motor operatively connected to the first rear wheel; and
an independent second electric motor operatively connected to the second rear wheel.

13. The mower of claim 8, wherein the transmission comprises an electric motor.

14. The mower of claim 8, further comprising a microcontroller adapted to receive the electrical signal indicative of the physical position of the handle grip relative to the handle member and generate a corresponding output command to the transmission.

15. A walk power mower comprising:
a deck supported upon the ground by at least a first wheel and a second wheel, the deck adapted to traverse the ground in both a forward direction and an opposite, reverse direction, wherein the first and second wheels operate as powered drive wheels of the mower;
a handle comprising a handle member extending rearwardly from the deck, wherein the handle member includes a first end and a second end, the second end operatively attached to the deck;
a prime mover carried by the deck, the prime mover operatively connected to a cutting member;
a variable speed, bidirectional transmission comprising first and second electric drive motors carried by the deck, wherein the first and second electric drive motors are adapted to selectively rotate the first and second drive wheels, respectively, to propel the deck over the ground; and
a control system comprising:
  a handle grip positioned at or near the first end of, and movable along, the handle member; and
  a position sensor adapted to generate an electrical signal indicative of a physical position of the handle grip relative to the handle member, wherein the electrical signal is provided to each of the first and second electric drive motors such that movement of the handle grip activates the transmission to proportionally power the drive wheels for movement of the deck:
    in the forward direction when the handle grip is moved from a neutral position directionally toward the deck; and
    in the reverse direction when the handle grip is moved from the neutral position directionally away from the deck.

16. The mower of claim 15, further comprising a microcontroller adapted to receive the electrical signal indicative of the physical position of the handle grip relative to the handle member and generate a corresponding output command to the first and second electric drive motors.

17. The mower of claim 15, wherein movement of the handle grip along the handle member comprises translation of the handle grip along the handle member.

* * * * *